(12) United States Patent
Keller

(10) Patent No.: US 11,733,410 B2
(45) Date of Patent: Aug. 22, 2023

(54) METHODS FOR DETECTING POTENTIAL FAULTS IN COOLING PATH OF PET IMAGING SYSTEM

(71) Applicant: Siemens Medical Solutions USA, Inc., Malvern, PA (US)

(72) Inventor: John Keller, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 520 days.

(21) Appl. No.: 16/949,631

(22) Filed: Nov. 9, 2020

(65) Prior Publication Data

US 2022/0146698 A1 May 12, 2022

(51) Int. Cl.
*G01T 7/00* (2006.01)
*G01F 1/696* (2006.01)
*G01M 3/26* (2006.01)
*G01T 1/29* (2006.01)

(52) U.S. Cl.
CPC .............. *G01T 7/00* (2013.01); *G01F 1/696* (2013.01); *G01M 3/26* (2013.01); *G01T 1/2985* (2013.01)

(58) Field of Classification Search
CPC ......... G01T 7/00; G01T 1/2985; G01F 1/696; G01F 1/684; G01M 3/26
See application file for complete search history.

(56) References Cited

U.S. PATENT DOCUMENTS

| 2013/0119259 A1* | 5/2013 | Martin | A61B 6/4488 |
| | | | 250/363.03 |
| 2018/0095182 A1* | 4/2018 | Su | A61B 6/037 |
| 2018/0231673 A1* | 8/2018 | Yan | G01T 1/2985 |
| 2022/0018916 A1* | 1/2022 | Chaitanya | F25B 49/00 |

\* cited by examiner

*Primary Examiner* — Kyle R Quigley
*Assistant Examiner* — Dacthang P Ngo

(57) ABSTRACT

A method for detecting potential faults in a cooling system that cools a detector electronic assembly (DEA) of a positron emission tomography (PET) imaging system having a plurality of PET detector rings each including a plurality of PET detectors having an associated DEA. The method includes verifying continuity of coolant lines in a coolant flow path of a DEA and calculating a flow rate through a coolant flow path of a DEA. Selected circuit board temperature sensors are used to detect temperature values that serve as surrogates for temperature change of a coolant. Further, the selected temperature sensors are located on hardware that is replicated on different points or locations on the flow path such that the temperature sensors have similar performance characteristics and are of like kind.

20 Claims, 25 Drawing Sheets

TABLE 1

STEP 1

| Sensor Temperature values (C) | DEA 18 | DEA 17 | DEA 16 | DEA 15 | DEA 14 | DEA 13 | DEA 12 | DEA 11 | DEA 10 | DEA 9 |
|---|---|---|---|---|---|---|---|---|---|---|
| DEA.0 | 39.30 | 39.15 | 39.13 | 38.95 | 39.04 | 39.10 | 39.29 | 38.92 | 38.99 | 39.14 |
| DEA.1 | 37.04 | 36.83 | 36.78 | 36.77 | 36.95 | 37.02 | 37.08 | 38.76 | 36.65 | 37.16 |
| DEA.2 | 33.63 | 33.37 | 33.50 | 33.51 | 33.67 | 33.75 | 33.62 | 33.24 | 33.12 | 33.32 |
| DEA.3 | 31.08 | 30.95 | 31.05 | 30.98 | 31.16 | 31.60 | 31.14 | 30.86 | 30.81 | 30.78 |
| Coolant Supply | 22.88 | 22.88 | 22.88 | 22.88 | 22.88 | 22.88 | 22.88 | 22.88 | 22.88 | 22.88 |

| DEA 8 | DEA 7 | DEA 6 | DEA 5 | DEA 4 | DEA 3 | DEA 2 | DEA 1 | DEA 0 | AVG |
|---|---|---|---|---|---|---|---|---|---|
| 40.92 | 40.71 | 39.86 | 51.03 | 39.62 | 39.52 | 39.53 | 39.56 | 50.51 | 40.6 |
| 38.49 | 36.70 | 37.39 | 47.40 | 37.74 | 37.11 | 37.31 | 37.21 | 46.71 | 38.3 |
| 34.18 | 32.99 | 33.22 | 39.95 | 33.30 | 33.19 | 33.43 | 33.23 | 40.26 | 34.1 |
| 31.53 | 30.65 | 30.90 | 35.74 | 30.75 | 30.55 | 30.94 | 30.96 | 35.50 | 31.5 |
| 22.88 | 22.88 | 22.88 | 22.88 | 22.88 | 22.88 | 22.88 | 22.88 | 22.88 | 22.88 |

FIG. 7B

TABLE 2

STEP 2 →

| ΔT Values (C) | DEA18 | DEA17 | DEA16 | DEA15 | DEA14 | DEA13 | DEA12 | DEA11 | DEA10 |
|---|---|---|---|---|---|---|---|---|---|
| DEA(3-Coolant) | 8.20 | 8.07 | 8.17 | 8.10 | 8.28 | 8.72 | 8.26 | 7.98 | 7.93 |
| DEA(0-1) ΔT | 2.26 | 2.32 | 2.35 | 2.18 | 2.08 | 2.08 | 2.20 | 0.17 | 2.34 |
| DEA(1-2) ΔT | 3.41 | 3.46 | 3.27 | 3.26 | 3.28 | 3.27 | 3.47 | 5.52 | 3.53 |
| DEA(2-3) ΔT | 2.55 | 2.42 | 2.46 | 2.54 | 2.51 | 2.15 | 2.47 | 2.39 | 2.31 |
| DEA(0-3) ΔT | 8.22 | 8.19 | 8.08 | 7.97 | 7.87 | 7.50 | 8.14 | 8.07 | 8.18 |

STEP 3 →

| DEA9 | DEA8 | DEA7 | DEA6 | DEA5 | DEA4 | DEA3 | DEA2 | DEA1 | DEA0 | AVG |
|---|---|---|---|---|---|---|---|---|---|---|
| 7.90 | 8.65 | 7.77 | 8.02 | 12.86 | 7.87 | 7.67 | 8.06 | 8.08 | 12.62 | 8.59 |
| 1.98 | 2.43 | 4.01 | 2.47 | 3.63 | 1.89 | 2.41 | 2.22 | 2.35 | 3.79 | 2.38 |
| 3.85 | 4.32 | 3.71 | 4.18 | 7.45 | 4.43 | 3.92 | 3.88 | 3.99 | 6.46 | 4.14 |
| 2.53 | 2.64 | 2.34 | 2.32 | 4.21 | 2.55 | 2.64 | 2.49 | 2.26 | 4.75 | 2.66 |
| 8.36 | 9.39 | 10.07 | 8.96 | 15.29 | 8.87 | 8.97 | 8.59 | 8.60 | 15.00 | 9.18 |

TABLE 3

| Normalized ΔT Values | DEA18 | DEA17 | DEA16 | DEA15 | DEA14 | DEA13 | DEA12 | DEA11 | DEA10 |
|---|---|---|---|---|---|---|---|---|---|
| DEA(3-Coolant) ΔT norm | 0.95 | 0.94 | 0.95 | 0.94 | 0.96 | 1.02 | 0.96 | 0.93 | 0.92 |
| DEA(0-1) ΔT norm | 0.95 | 0.97 | 0.99 | 0.92 | 0.88 | 0.87 | 0.93 | 0.07 | 0.98 |
| DEA(1-2) ΔT norm | 0.82 | 0.84 | 0.79 | 0.79 | 0.79 | 0.79 | 0.84 | 1.33 | 0.85 |
| DEA(2-3) ΔT norm | 0.96 | 0.91 | 0.92 | 0.95 | 0.94 | 0.81 | 0.93 | 0.90 | 0.87 |
| DEA(0-3) ΔT norm | 0.90 | 0.89 | 0.88 | 0.87 | 0.86 | 0.82 | 0.89 | 0.88 | 0.89 |
| avg | 0.92 | 0.91 | 0.91 | 0.89 | 0.89 | 0.86 | 0.91 | 0.82 | 0.90 |

Step 4 (rows 1–5); Step 5 (avg)

| DEA9 | DEA8 | DEA7 | DEA6 | DEA5 | DEA4 | DEA3 | DEA2 | DEA1 | DEA0 | AVG |
|---|---|---|---|---|---|---|---|---|---|---|
| 0.92 | 1.01 | 0.90 | 0.93 | 1.50 | 0.92 | 0.89 | 0.94 | 0.94 | 1.47 | 1.00 |
| 0.83 | 1.02 | 1.69 | 1.04 | 1.53 | 0.79 | 1.02 | 0.93 | 0.99 | 1.60 | 1.00 |
| 0.93 | 1.04 | 0.90 | 1.01 | 1.80 | 1.07 | 0.95 | 0.94 | 0.96 | 1.56 | 1.00 |
| 0.95 | 0.99 | 0.88 | 0.87 | 1.58 | 0.96 | 0.99 | 0.94 | 0.85 | 1.79 | 1.00 |
| 0.91 | 1.02 | 1.10 | 0.98 | 1.67 | 0.97 | 0.98 | 0.94 | 0.94 | 1.64 | 1.00 |
| 0.91 | 1.02 | 1.09 | 0.97 | 1.61 | 0.94 | 0.97 | 0.94 | 0.94 | 1.61 | 1.00 |

Step 4; Step 5 — 98

FIG. 9B

TABLE 4

| Normalized ΔT Values | DEA18 | DEA17 | DEA16 | DEA15 | DEA14 | DEA13 | DEA12 | DEA11 | DEA10 | DEA9 | DEA8 | DEA7 | DEA6 | DEA5 | DEA4 | DEA3 | DEA2 | DEA1 | DEA0 | AVG |
|---|---|---|---|---|---|---|---|---|---|---|---|---|---|---|---|---|---|---|---|---|
| DEA(3-Coolant) ΔT norm | 0.95 | 0.94 | 0.95 | 0.94 | 0.96 | 1.02 | 0.96 | 0.93 | 0.92 | 0.92 | 1.01 | 0.90 | 0.93 | 1.50 | 0.92 | 0.89 | 0.94 | 0.94 | 1.47 | 1.00 |
| DEA(0-1) ΔT norm | 0.95 | 0.97 | 0.99 | 0.92 | 0.88 | 0.87 | 0.93 | 1.07 | 0.98 | 0.83 | 1.02 | 1.69 | 1.04 | 1.53 | 0.79 | 1.02 | 0.93 | 0.99 | 1.60 | 1.00 |
| DEA(1-2) ΔT norm | 0.82 | 0.84 | 0.79 | 0.79 | 0.79 | 0.79 | 0.84 | 1.33 | 0.85 | 0.93 | 1.04 | 0.90 | 1.01 | 1.80 | 1.07 | 0.95 | 0.94 | 0.96 | 1.56 | 1.00 |
| DEA(2-3) ΔT norm | 0.96 | 0.91 | 0.92 | 0.95 | 0.94 | 0.81 | 0.93 | 0.90 | 0.87 | 0.95 | 0.99 | 0.88 | 0.87 | 1.58 | 0.96 | 0.99 | 0.94 | 0.85 | 1.79 | 1.00 |
| DEA(0-3) ΔT norm | 0.90 | 0.89 | 0.88 | 0.87 | 0.86 | 0.82 | 0.89 | 0.88 | 0.89 | 0.91 | 1.02 | 1.10 | 0.98 | 1.67 | 0.97 | 0.98 | 0.94 | 0.94 | 1.64 | 1.00 |
| avg | 0.92 | 0.91 | 0.91 | 0.89 | 0.89 | 0.86 | 0.91 | 0.82 | 0.90 | 0.91 | 1.02 | 1.09 | 0.97 | 1.61 | 0.94 | 0.97 | 0.94 | 0.94 | 1.61 | 1.00 |
| 1/avg | 1.09 | 1.10 | 1.10 | 1.12 | 1.13 | 1.16 | 1.10 | 1.22 | 1.11 | 1.10 | 0.98 | 0.91 | 1.04 | 0.62 | 1.06 | 1.04 | 1.07 | 1.07 | 0.62 | 1.03 |

FIG. 11

TABLE 5

| Normalized ΔT Values | DEA 18 | DEA 17 | DEA 16 | DEA 15 | DEA 14 | DEA 13 | DEA 12 | DEA 11 | DEA 10 | DEA 9 | DEA 8 | DEA 7 | DEA 6 | DEA 5 | DEA 4 | DEA 3 | DEA 2 | DEA 1 | DEA 0 | AVG |
|---|---|---|---|---|---|---|---|---|---|---|---|---|---|---|---|---|---|---|---|---|
| DEA(3-Coolant) ΔT norm | 0.95 | 0.94 | 0.95 | 0.94 | 0.96 | 1.02 | 0.96 | 0.93 | 0.92 | 0.92 | 1.01 | 0.90 | 0.93 | 1.50 | 0.92 | 0.89 | 0.94 | 0.94 | 1.47 | 1.00 |
| DEA(0-1) ΔT norm | 0.95 | 0.97 | 0.99 | 0.92 | 0.88 | 0.87 | 0.93 | 0.07 | 0.98 | 0.83 | 1.02 | 1.69 | 1.04 | 1.53 | 0.79 | 1.02 | 0.93 | 0.99 | 1.60 | 1.00 |
| DEA(1-2) ΔT norm | 0.82 | 0.84 | 0.79 | 0.79 | 0.79 | 0.79 | 0.84 | 1.33 | 0.85 | 0.93 | 1.04 | 0.90 | 1.01 | 1.80 | 1.07 | 0.95 | 0.94 | 0.96 | 1.56 | 1.00 |
| DEA(2-3) ΔT norm | 0.96 | 0.91 | 0.92 | 0.95 | 0.94 | 0.81 | 0.93 | 0.90 | 0.87 | 0.95 | 0.99 | 0.88 | 0.87 | 1.58 | 0.96 | 0.99 | 0.94 | 0.85 | 1.79 | 1.00 |
| DEA(0-3) ΔT norm | 0.90 | 0.89 | 0.88 | 0.87 | 0.86 | 0.82 | 0.89 | 0.88 | 0.89 | 0.91 | 1.02 | 1.10 | 0.98 | 1.67 | 0.97 | 0.98 | 0.94 | 0.94 | 1.64 | 1.00 |
| avg | 0.92 | 0.91 | 0.91 | 0.89 | 0.89 | 0.86 | 0.91 | 0.82 | 0.90 | 0.91 | 1.02 | 1.09 | 0.97 | 1.61 | 0.94 | 0.97 | 0.94 | 0.94 | 1.61 | 1.00 |
| 1/avg | 1.09 | 1.10 | 1.10 | 1.12 | 1.13 | 1.16 | 1.10 | 1.22 | 1.11 | 1.10 | 0.98 | 0.91 | 1.04 | 0.62 | 1.06 | 1.04 | 1.07 | 1.07 | 0.62 | 1.03 |
| Normalized f/avg | 1.06 | 1.06 | 1.07 | 1.08 | 1.09 | 1.12 | 1.07 | 1.18 | 1.07 | 1.06 | 0.95 | 0.89 | 1.00 | 0.60 | 1.03 | 1.00 | 1.03 | 1.03 | 0.60 | 1.00 |

Step 8

FIG. 12

METHODS FOR DETECTING POTENTIAL FAULTS IN COOLING PATH OF PET IMAGING SYSTEM

TECHNICAL FIELD

Aspects of the present invention relate to cooling system for cooling a detector electronics assembly (DEA) for positron emission tomography (PET) imaging system, and more particularly, to a method for detecting potential faults in the cooling system by verifying continuity of coolant lines in a coolant flow path of a DEA and calculating a flow rate through a coolant flow path of a DEA wherein selected circuit board temperature sensors are used to detect temperature values to serve as surrogates for temperature change of a coolant wherein the temperature sensors are located on hardware that is replicated on different points or locations on the flow path such that the temperature sensors have similar performance characteristics and are of like kind.

BACKGROUND

Medical imaging systems, such as positron emission tomography/computed tomography (PET/CT) imaging systems, include a scanner portion having several detectors arranged in a plurality of detector rings about a tunnel of the system. The detectors serve to scan a patient located in the tunnel in order to detect gamma rays that are generated after a radioisotope is injected into the patient. Information from the gamma rays is then used to generate three-dimensional (3D) images of the patient or portions of the patient. A PET/CT imaging system may include several detectors, for example, 76 detectors or more may be used. Each detector is liquid cooled in order to remove undesirable heat that affects reliability and operation of the electronic components. The coolant is supplied to the electronic components via coolant lines at a suitable flow rate for removing sufficient heat.

The detectors include numerous electronic components that are kept within temperature limits during normal operation. Several different faults may cause the electrical components to exceed their normal operating temperature limits. One type of fault is due to an insufficient coolant flow rate for the cooling fluid or coolant that results in the temperature limit for the electronic component being exceeded. Another type of fault occurs when a block of detectors exceeds a temperature threshold due to coolant lines that are incorrectly connected. If such faults occur, the scanner is configured to shut down. If the scanner shuts down after the patient is injected with the radioisotope, and before a scan is completed, a safety related complaint may be generated since the patient may have been exposed to a dose of radiation without the benefit of a scan.

When a temperature sensor exceeds its error threshold resulting in a scanner shutdown, a service technician is sent to the site to replace the faulty component. Typically, there is not enough information available for the technician to determine the precise reason that the component exceeded its error limit. Thus, the technician replaces the entire electronics assembly in order to restore operation of the scanner and sends the suspect assembly back to the manufacturer to determine the root the cause of failure. However, this process is inefficient since a substantial amount of time and resources are needed for a failure investigation to be completed. Thus, it is desirable to identify the potential for such temperature errors before the errors occur. Further, it is desirable to provide system diagnostics that can isolate a fault in an imaging system.

SUMMARY OF THE INVENTION

A method is disclosed for detecting potential faults in a cooling system that cools a detector electronic assembly (DEA) of a positron emission tomography (PET) imaging system having a plurality of PET detector rings each including a plurality of PET detectors having an associated DEA. The method includes verifying continuity of coolant lines in a coolant flow path of a DEA and calculating a flow rate through a coolant flow path of a DEA. Selected circuit board temperature sensors are used to detect temperature values that serve as surrogates for temperature change of a coolant. Further, the selected temperature sensors are located on hardware that is replicated on different points or locations on the flow path such that the temperature sensors have similar performance characteristics and are of like kind.

In an embodiment, a method is disclosed for detecting potential faults in a cooling system that cools a detector electronic assembly (DEA) of a positron emission tomography (PET) imaging system having a plurality of PET detector rings each including a plurality of PET detectors having an associated DEA. The method includes (1) verifying continuity of coolant lines in a coolant flow path of a DEA by (a) reducing a screening flow rate in a PET gantry of the PET imaging system for a period of time, (b) detecting a temperature of electronic components in each DEA in a second pass line of the coolant flow path using a first temperature sensor and (c) determining whether the temperature detected in step (b) progressively increases from a first DEA to a last DEA in the second pass line. In addition, verifying the continuity of coolant lines includes (d) detecting a temperature of electronic components in each DEA in the second pass line using a second temperature sensor, (e) determining whether the temperature detected in step (d) progressively increases from the first DEA to the last DEA in the second pass line, detecting a temperature of electronic components in each DEA in the second pass line using a third temperature sensor and (g) determining whether the temperature detected in step (f) progressively increases from the first DEA to the last DEA in the second pass line. Further, verifying the continuity of coolant lines includes (h) determining whether an average detector block temperature of a single DEA does not deviate from the average detector block temperature of the remaining DEAs in the same detector ring by more than a predetermined amount wherein if the average block temperature deviates by more than the predetermined amount and the detected temperature in steps (c), (e) and (g) does not progressively increase, an incorrect hose line connection is indicated.

The method further includes (2) calculating a flow rate through a coolant flow path of a DEA by (i) detecting a temperature value for each DEA in each PET detector ring, (j) calculating a change in temperature ($\Delta T$) between the PET detector rings for each aligned DEA based on the temperature values to provide more than one sequence of $\Delta T$ values, (k) calculating an average $\Delta T$ of all DEAs for each $\Delta T$ sequence determined in step (j) and (l) normalizing each $\Delta T$ value calculated in step (j) by dividing each $\Delta T$ value by the average $\Delta T$ for that series as calculated in step (k). In addition, calculating the flow rate includes (m) calculating an average of the normalized $\Delta T$ values obtained in step (l) for each DEA, (n) calculating the inverse of the average normalized $\Delta T$ values obtained in step (m), (o) calculating the average of the inversed averages for all DEAs and (p) normalizing the inversed averages calculated in step (n) by dividing the inversed averages by the average of all DEAs calculated in step (o). Further calculating the flow rate includes (q) determining net DEA flow by summing the coolant flow rates reported by system flow meters, (r) determining nominal flow at each DEA by dividing the net DEA flow by the number of DEAs and (s) multiplying nominal DEA flow at each DEA by the corresponding values calculated in step (p) for normalized inversed averages to determine flow at each DEA.

Those skilled in the art may apply the respective features of the present invention jointly or severally in any combination or sub-combination.

BRIEF DESCRIPTION OF THE DRAWINGS

The exemplary embodiments of the invention are further described in the following detailed description in conjunction with the accompanying drawings, in which:

FIG. 7B includes Table 1 which lists the temperature sensor values used in FIG. 7A.

FIG. 8B includes Table 2 which lists the ΔT values used in FIG. 8A.

FIG. 9B includes Table 3 which lists the normalized ΔT values used in FIG. 9A.

FIG. 11 includes Table 4 which tabulates the inverse of the average normalized ΔT values in accordance with Step 5 and includes the average of the inversed averages for all DEAs obtained in accordance with Step 7.

FIG. 12 includes Table 5 which lists the normalized inversed averages obtained in accordance with Step 8.

DETAILED DESCRIPTION

Figure 1:
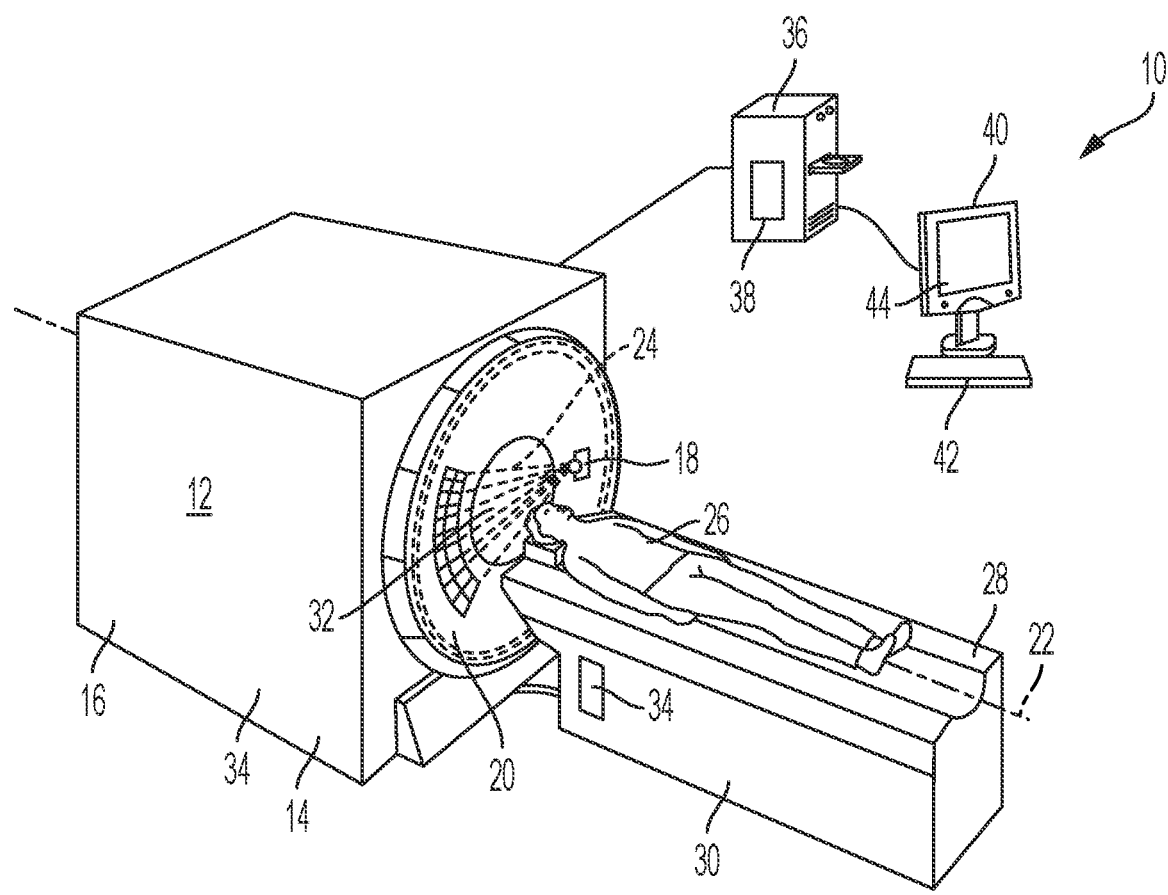
FIG. 1 is a view of an exemplary medical imaging system in accordance with an aspect of the invention.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Referring to FIG. 1, a view of an exemplary medical imaging system 10 in accordance with an aspect of the invention is shown. In an aspect, the invention may be used in conjunction with a positron emission tomography/computed tomography (PET/CT) imaging system 12 having a CT portion 14 and a PET portion 16. The CT portion 14 includes a recording unit, comprising an X-ray source 18 and an X-ray detector 20. The recording unit rotates about a longitudinal axis 22 during the recording of a tomographic image, and the X-ray source 18 emits X-rays 24 during a spiral recording. While an image is being recorded a patient 26 lies on a bed 28. The bed 28 is connected to a table base 30 such that it supports the bed 28 bearing the patient 26. The bed 28 is designed to move the patient 26 along a recording direction through an opening or tunnel 32 of a gantry 34 of the system 12. The table base 30 includes a control unit 34 connected to a computer 36 to exchange data. In the example shown in FIG. 1, a medical diagnostic or therapeutic unit is designed in the form of a system 12 by a determination unit 38 in the form of a stored computer program that can be executed on the computer 36. The computer 36 is connected to an output unit 40 and an input unit 42. The output unit 40 is, for example, one (or more) liquid crystal display (LCD) or plasma screen(s). An output 44 on the output unit 40 comprises, for example, a graphical user interface for actuating the individual units of the system 12 and the control unit 34. Furthermore, different views of the recorded data can be displayed on the output unit 40. The input unit 42 is for example a keyboard, mouse, touch screen or a microphone for speech input.

Figure 2:
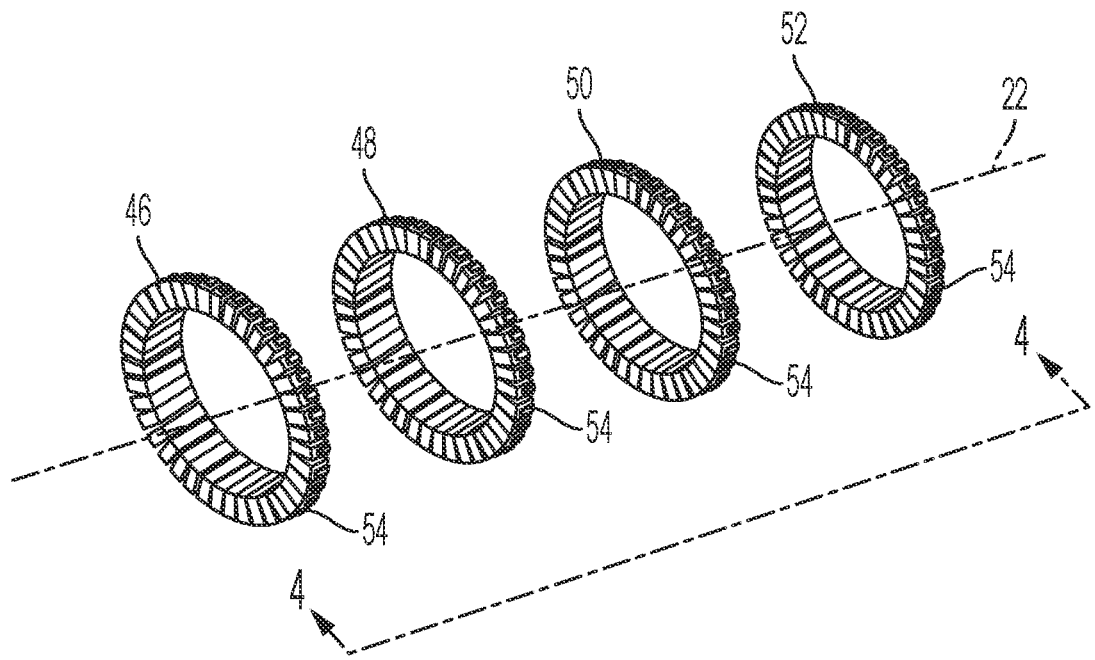
FIG. 2 depicts exemplary first, second, third and fourth detector rings.

The PET portion 16 includes a plurality of PET detector rings. Referring to FIG. 2, exemplary first 46, second 48, third 50 and fourth 52 detector rings are shown. Each detector ring 46, 48, 50, 52 includes a plurality of PET detectors 54 used to scan the patient 26 located in the tunnel 32. In an embodiment, each detector ring 46, 48, 50, 52 includes 19 PET detectors. In alternate embodiments, the PET portion 16 may include greater or less than four detector rings 46, 48, 50, 52 and/or greater or less than 19 detectors. During a known operation of the PET portion 16 of system 12, a patient 26 located in the tunnel 32 is injected with a radioisotope. The radioisotope undergoes positron emission decay and emits a positron that encounters and annihilates with an electron to produce a pair of gamma rays moving in approximately opposite directions. The gamma rays are detected by the PET detectors 54 and information from the gamma rays is used to generate PET images. The PET images are then used in conjunction with CT images generated by the CT portion 14 of system 12 to provide images of the patient 26 or part of a patient's anatomy.

Electronic components associated with each PET detector 54 are liquid cooled in order to remove undesirable heat that affects reliability and operation of the electronic components. The coolant is supplied to the electronic components via coolant lines at a suitable flow rate for removing sufficient heat. The PET detectors 54 include numerous electronic components that are kept within temperature limits during normal operation. Several different faults may cause the electrical components to exceed their normal operating temperature limits. One type of fault is due to an insufficient coolant flow rate for the coolant that results in the temperature limit for the electronic component being exceeded.

In accordance with an aspect of the invention, preexisting temperature sensors located on circuit boards are used in combination with a method of using a difference in temperature ($\Delta T$) detected by temperature sensors having similar performance characteristics (i.e. are of like kind) in series flow to generate normalized dimensionless parameters. The normalized dimensionless parameters are used to determine a specific coolant flow rate along a coolant flow path that supplies coolant to the electronic components. This provides system diagnostic capabilities that enables detection of a specific fault, such as an overly restrictive coolant line, during the manufacturing process or once the system is in use and before the fault results in an unexpected system shut down.

Figure 3:
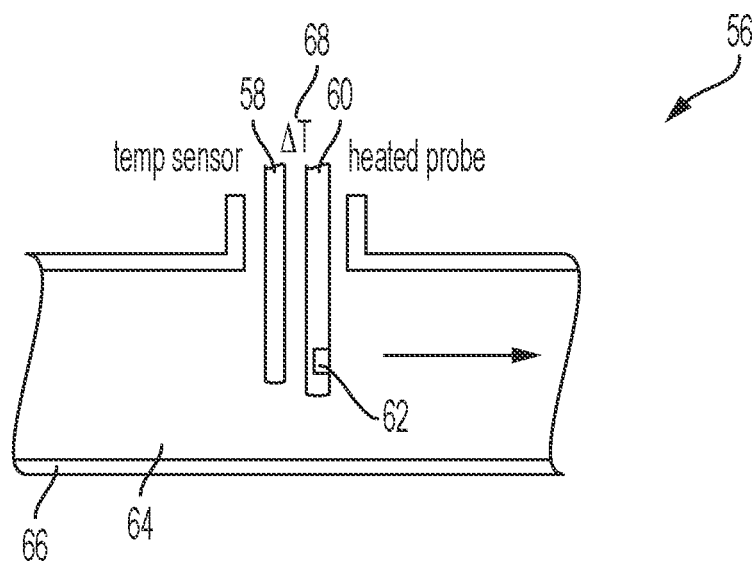
FIG. 3 is a schematic diagram of an exemplary thermal flow meter.

Known thermal flow meters use a temperature rise of a heated fluid to measure flow of that fluid through a pipe or duct. Referring to FIG. 3, a schematic diagram of an exemplary thermal flow meter 56 is shown. The flow meter 56 includes a temperature sensor 58 and heated probe 60 that includes a temperature sensor 62. The sensor 58 and probe 60 are both inserted into a fluid 64 flowing through a pipe or duct 66, for example. Typically, a measured amount of heat is applied to the probe 60 in the flow meter 56. Heat lost to the flowing fluid 64 causes a temperature change. As flow changes, so does the rate of heat transfer and temperature. The amount of heat lost (i.e. transferred to the fluid 64) is quantified by a change in temperature ($\Delta T$) 68 measured by the temperature sensors 58, 62 in the flow meter 56. Thermal flow meters use the change in temperature $\Delta T$ 68 resulting from a known heat transferred to a fluid 64 with known properties to determine fluid flow. Selected principles of operation of known thermal flow meters are used in an aspect of the invention.

Figure 4:
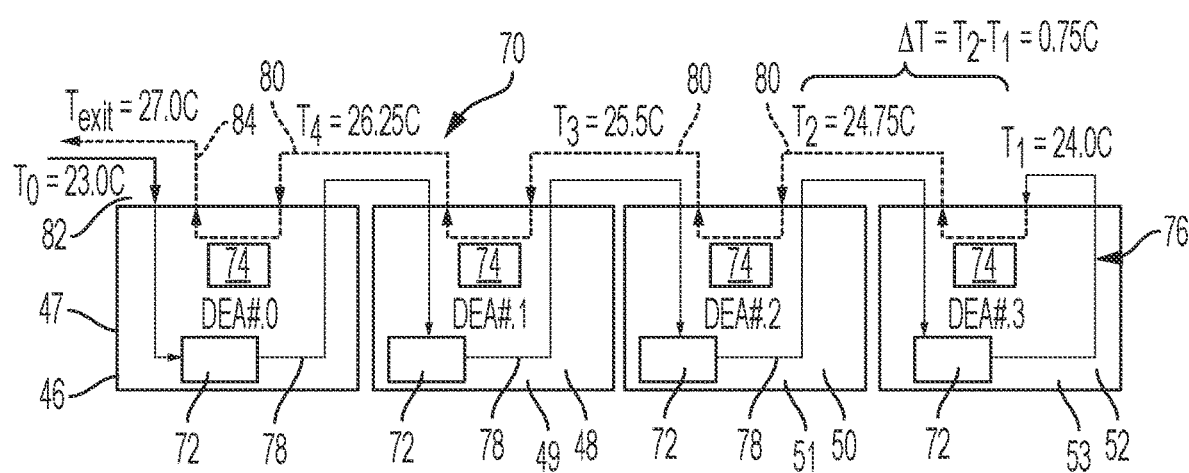
FIG. 4 is a schematic representation along view line 4-4 of FIG. 2 and depicts a coolant flow path between exemplary detector electronic assemblies (DEAs) associated with aligned PET detectors located in first, second, third and fourth detector rings.

Referring to FIG. 4, a schematic representation along view line 4-4 of FIG. 2 is shown of a coolant flow path 70 between detector electronic assemblies (DEAs) associated with aligned PET detectors 54 located in the first 46, second 48, third 50 and fourth 52 detector rings. For purposes of illustration, the first 46, second 48, third 50 and fourth 52 detector rings include first 47, second 49, third 51 and fourth 53 DEAs designated as DEA #0.0, DEA #0.1, DEA #0.2 and DEA #0.3, respectively, wherein "#" refers to a specific DEA in a detector ring 46, 48, 50, 52. In an exemplary embodiment, each detector ring 46, 48, 50, 52 includes 19 DEAs designated as DEA0, DEA1, DEA2, DEA3, DEA4, DEA5, DEA6, DEA7, DEA8, DEA9, DEA10, DEA11, DEA12, DEA13, DEA14, DEA15, DEA16, DEA17 and DEA18 (i.e. DEA0-DEA18). Each DEA in the detector rings 46, 48, 50, 52 is aligned in an axial direction (i.e. aligned in a row in an axial direction corresponding to the longitudinal axis 22) with a corresponding DEA in an adjacent detector ring 46, 48, 50, 52 wherein aligned DEAs have the same designation. For example, DEA 0.0, DEA 0.1, DEA 0.2 and DEA 0.3 refers to DEA0 in the first 46, second 48, third 50 and fourth 52 detector rings wherein all the DEA0s in the detector rings 46, 48, 50, 52 are aligned with each other in the axial direction.

The coolant flow path 70 extends between the detector rings 46, 48, 50, 52 for each DEA0-DEA18, resulting in 19 coolant flow paths wherein the coolant flow paths are parallel to each other. FIG. 4 depicts one of the 19 parallel coolant flow paths as previously described. Each DEA (i.e. DEA #0.0, DEA #0.1, DEA #0.2, and DEA #0.3) includes first 72 and second 74 sets of electronics that are cooled by a coolant that flows along the coolant flow path 70. The first set of electronics 72 includes electronics that are more important to operation of the associated DEA than the second set of electronics 74. The coolant flow path 70 is defined by a single coolant line 76 having a first pass section 78 and a return section 80. The first pass section 78 of the coolant line 76 is connected between the first set of electronics 72 associated with DEA #0.0 and DEA #0.1, DEA #0.1 and DEA #0.2, and DEA #0.2 and DEA #0.3. The return section 80 of the coolant line 76 is connected between the second set of electronics 74 associated with DEA #0.3 and DEA #0.2, DEA #0.2 and DEA #0.1, and DEA #0.1 and DEA #0.0 such that the first set of electronics 72 and second set of electronics 74 are connected in series flow to form a series cooling line arrangement. The coolant is received at an inlet 82 for the first pass section 78 located at DEA.0. The coolant exits the return section 80 at an outlet 84 located at DEA.0.

During operation of the PET portion 16 of system 12, electronic components in each DEA generate heat which is transferred to the coolant and carried away by the coolant at a suitable flow rate, thus cooling the electronic components and increasing the temperature of the coolant. The first pass section 78 initially supplies first pass coolant to the first set of electronic components 72 in order to cool the first set of electronic components 72. The return section 80 receives coolant from the first pass section 78 which is then supplied to the second set of electronic components 74 in order to cool the second set of electronics 74. The temperature of the coolant increases as the coolant flows through the first pass 78 and return 80 sections. For example, coolant may enter DEA #0.0 via the inlet 82 at a temperature $T_0$ of approximately 23.0 C (note: all temperatures in the following description are approximate). The coolant temperature then increases to $T_1$=24.0 C after flowing through the first pass section 78, and prior to entering the return section 80, after having cooled the first set electronics 72 in DEA #0.0, DEA #0.1, DEA #0.2 and DEA #0.3. The coolant then flows through the return section 80 to cool the second set electronics 74 wherein the coolant temperature increases to $T_2$=24.75 C, $T_3$=25.5 C, $T_4$=26.25 C and $T_{exit}$=27.0 C at the outlet 84 of DEA #0.0 after cooling the second set electronics 74 in DEA #0.3, DEA #0.2, DEA #0.1 and DEA #0.0, respectively. For example, the change or difference in temperature ($\Delta T$) between DEA #0.2 and DEA #0.3 is $T_2-T_1$=24.75 C−24.0 C=0.75 C.

If $\Delta T$ is known for a series of DEAs, the coolant flow rate may be calculated by using a known energy balance equation:

$$Q=mC_p\Delta T \qquad \text{Eqn. (1)}$$

wherein Q=the heat in kilowatts (kW), m=mass flow rate of coolant and $C_p$=specific heat of the coolant. It is not desirable to measure $\Delta T$ of the coolant for all 19 coolant flow paths due to the complexity involved and system hardware burden. In accordance with aspects of the invention, it has been determined that $\Delta T$ values detected by circuit board mounted temperature sensors, used to measure temperatures other than coolant temperature, may be used as a surrogate or substitute for coolant $\Delta T$ provided sensor criteria determined in accordance with the invention are met. In particular, the sensor criteria of the invention sets forth that the temperature sensors, in series, are located on hardware that is replicated on different points or locations on the flow path, i.e. that the temperature sensors have similar performance characteristics and are of like kind. The sensor criteria of the invention also sets forth that the inherent variability of the temperature sensor output within the system is relatively low. In addition, the sensor criteria sets forth that the $\Delta T$ values generated by the temperature sensors are able to be processed via a method to determine flow rate with sufficient confidence.

Figure 5:
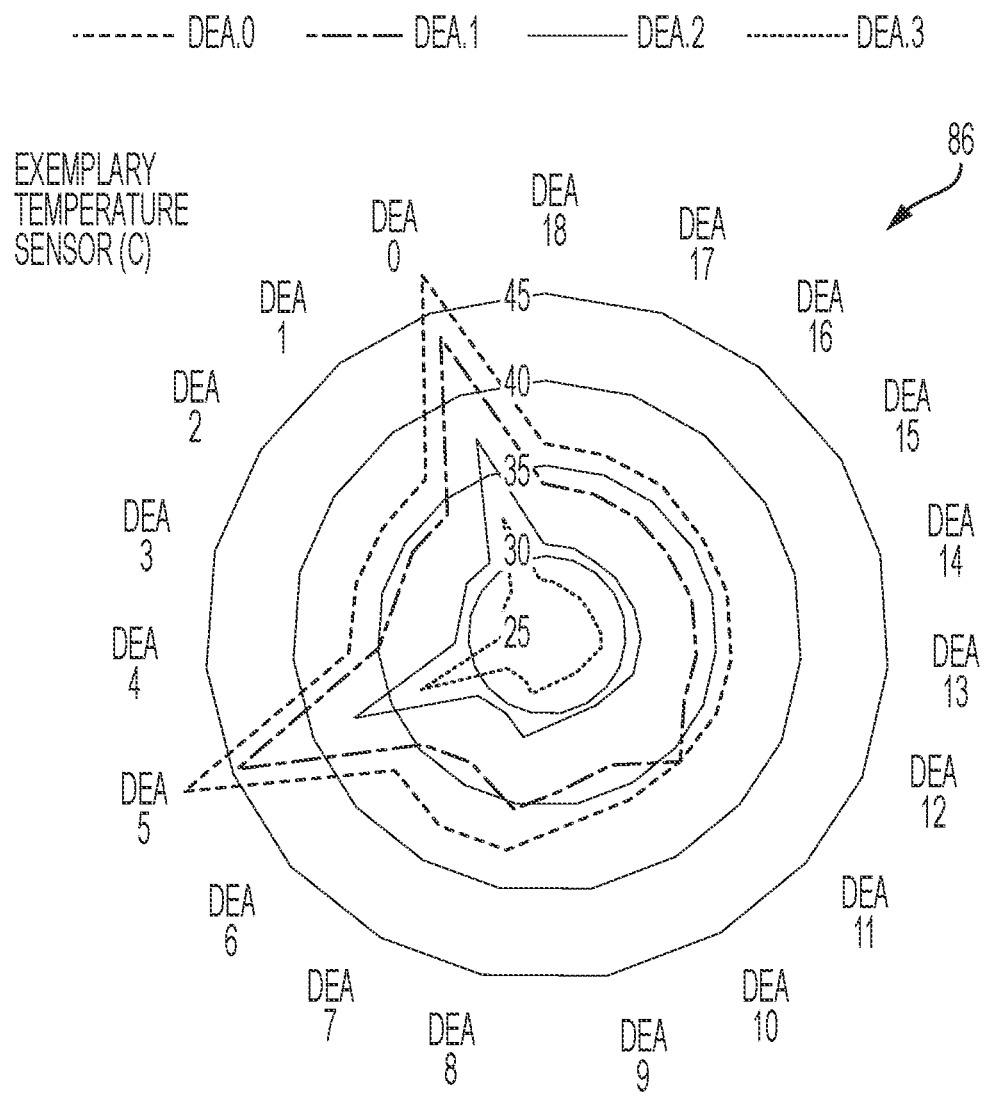
FIG. 5 is a radar plot of temperatures reported by an exemplary temperature sensor that meets sensor criteria.

A DEA may have numerous board mounted temperature sensors in various locations within the DEA assembly. For example, a DEA may include over 70 board mounted temperature sensors many of which do not comply with the previously mentioned sensor criteria. Referring to FIG. 5, a radar plot 86 is shown of temperatures reported by an exemplary temperature sensor that meets the previously described sensor criteria. In particular, FIG. 5 shows a relatively uniform gap between the temperature sensor values reported at DEA #0.0, DEA #0.1, DEA #0.2 and DEA #0.3 for associated DEA0-DEA18 in series flow for the temperature sensor.

Figure 6A:
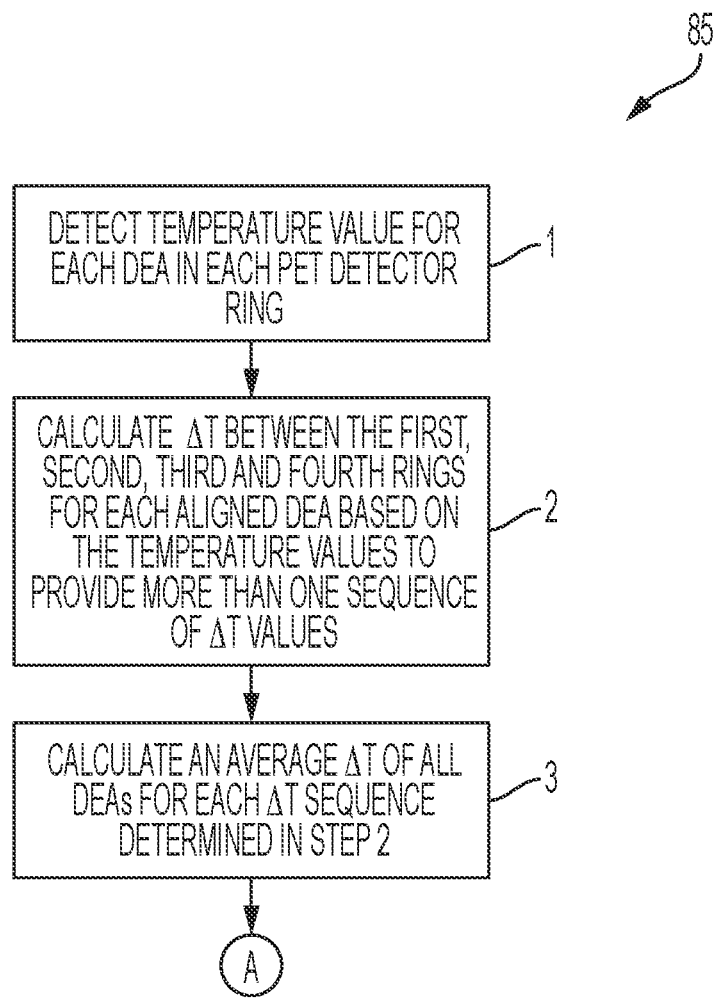
FIGS. 6A-6C depict a method for calculating a flow rate through each coolant flow path in accordance with an aspect of the invention.
Figure 6B:
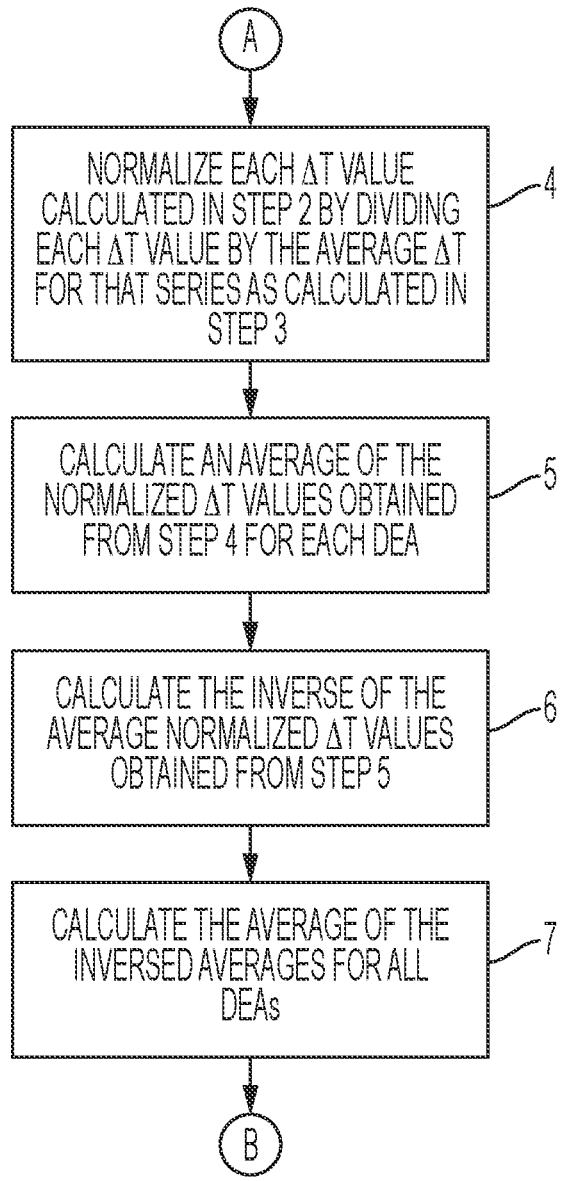
Figure 6C:
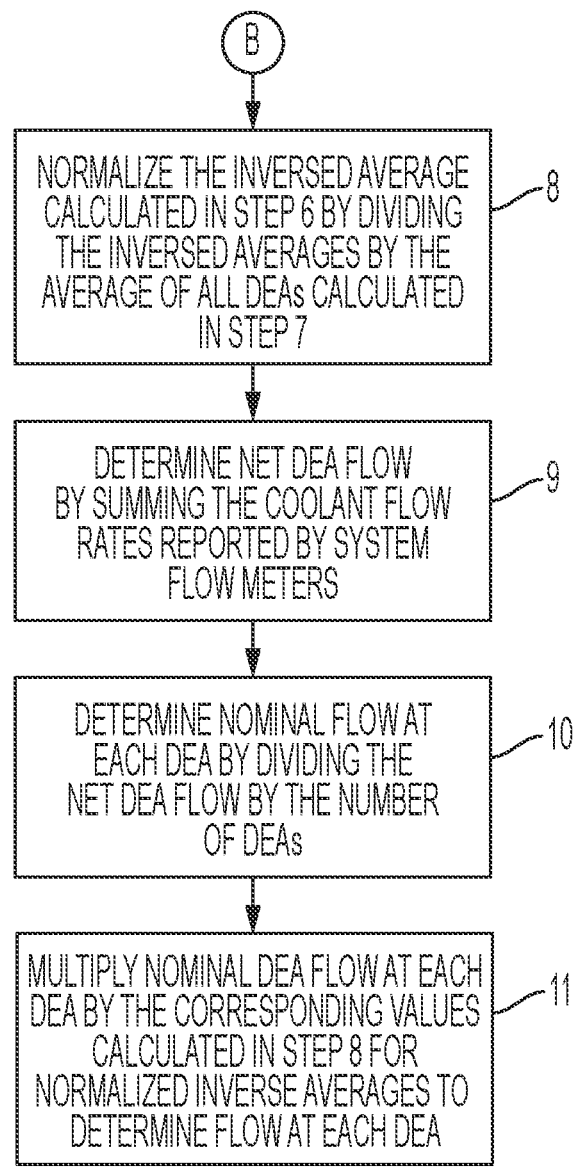

Referring to FIGS. 6A-6C, a method 85 is shown for calculating a flow rate through each coolant flow path (i.e. DEA series coolant flow calculation) in accordance with an aspect of the invention. For purposes of illustration, the method 85 will be described for an exemplary PET portion 16 having the first, second, third and fourth detector rings (i.e. DEA.0, DEA.1, DEA.2, and DEA.3, respectively) each having 19 DEAs (i.e. DEA0-DEA18) thus forming 19 parallel coolant flow paths as previously described.

At Step 1, a temperature value is detected by a temperature sensor that meets the previously described sensor criteria (i.e. a selected temperature sensor) for each DEA (i.e. DEA18-DEA0 in this example) in each of the detector rings (i.e. DEA.0, DEA.1, DEA.2, and DEA.3 in this example). At Step 2, $\Delta T$ is calculated between the first, second, third and fourth detector rings (i.e. DEA.0, DEA.1, DEA.2, and DEA.3, respectively) for each aligned DEA (i.e. DEA18-DEA0) based on temperature values detected by the selected temperature sensor using the following equations:

$$\Delta T_{0.3\text{-}C}=\text{DEA.3}-\text{Coolant Supply Temp} \qquad \text{Eqn. (2)}$$

$$\Delta T_{0.0\text{-}0.1}=\text{DEA.0}-\text{DEA.1} \qquad \text{Eqn. (3)}$$

$$\Delta T_{0.1\text{-}0.2}=\text{DEA.1}-\text{DEA.2} \qquad \text{Eqn. (4)}$$

$$\Delta T_{0.2\text{-}0.3}=\text{DEA.2}-\text{DEA.3} \qquad \text{Eqn. (5)}$$

$$\Delta T_{0.0\text{-}0.3}=\text{DEA.0}-\text{DEA.3} \qquad \text{Eqn. (6)}$$

This generates a $\Delta T$ value between corresponding aligned DEAs for each of the Eqns. (2)-(6) thus providing more than one sequence of $\Delta T$ values.

At Step 3, an average $\Delta T$ is calculated of all DEAs (i.e. DEA18-DEA0) for each $\Delta T$ sequence determined in Step 2. At Step 4, each $\Delta T$ value calculated in Step 2 is normalized by dividing each $\Delta T$ value by the average $\Delta T$ for that series as calculated in Step 3 as follows:

$$\text{Normalized } \Delta T_{0.3\text{-}C}=[\text{DEA.3}-\text{Coolant Supply Temp}]/\text{Average } \Delta T \text{ of all DEAs} \qquad \text{Eqn. (7)}$$

$$\text{Normalized } \Delta T_{0.2\text{-}0.3}=[\text{DEA.2}-\text{DEA.3}]/\text{Average } \Delta T \text{ of all DEAs} \qquad \text{Eqn. (8)}$$

$$\text{Normalized } \Delta T_{0.1\text{-}0.2}=[\text{DEA.1}-\text{DEA.2}]/\text{Average } \Delta T \text{ of all DEAs} \qquad \text{Eqn. (9)}$$

$$\text{Normalized } \Delta T_{0.0\text{-}0.1}=[\text{DEA.0}-\text{DEA.1}]/\text{Average } \Delta T \text{ of all DEAs} \qquad \text{Eqn. (10)}$$

$$\text{Normalized } \Delta T_{0.0\text{-}0.3}=[\text{DEA.0}-\text{DEA.3}]/\text{Average } \Delta T \text{ of all DEAs} \qquad \text{Eqn. (11)}$$

In the current example, "Average $\Delta T$ of all DEAs" refers to the average $\Delta T$ of all 19 DEAs.

In addition, the method 85 includes calculating an average of the normalized $\Delta T$ values obtained from Step 4 for each DEA (i.e. DEA18-DEA0) at Step 5. At Step 6, the inverse of the average normalized $\Delta T$ values obtained from Step 5 is calculated. At Step 7, the average of the inversed averages for all DEAs (i.e. DEA18-DEA0) is calculated. At Step 8, the inversed averages calculated in Step 6 are normalized by dividing the inversed averages by the average of all DEAs (i.e. DEA18-DEA0) calculated in Step 7. At Step 9, a net DEA flow is determined by summing the coolant flow rates reported by system flow meters. At Step 10, the nominal flow at each DEA is determined by dividing the net DEA flow by the number of DEAs. At Step 11, the nominal DEA flow at each DEA is multiplied by the corresponding values calculated in Step 8 for normalized inversed averages to determine flow at each DEA.

For purposes of illustration, the method 85 will be described in conjunction with exemplary temperature values detected by the exemplary selected temperature sensor. In accordance with an aspect of the invention, additional temperature sensors may be incorporated into the previously described calculations if the accuracy of the selected temperature sensor is determined to be insufficient.

Figure 7A:
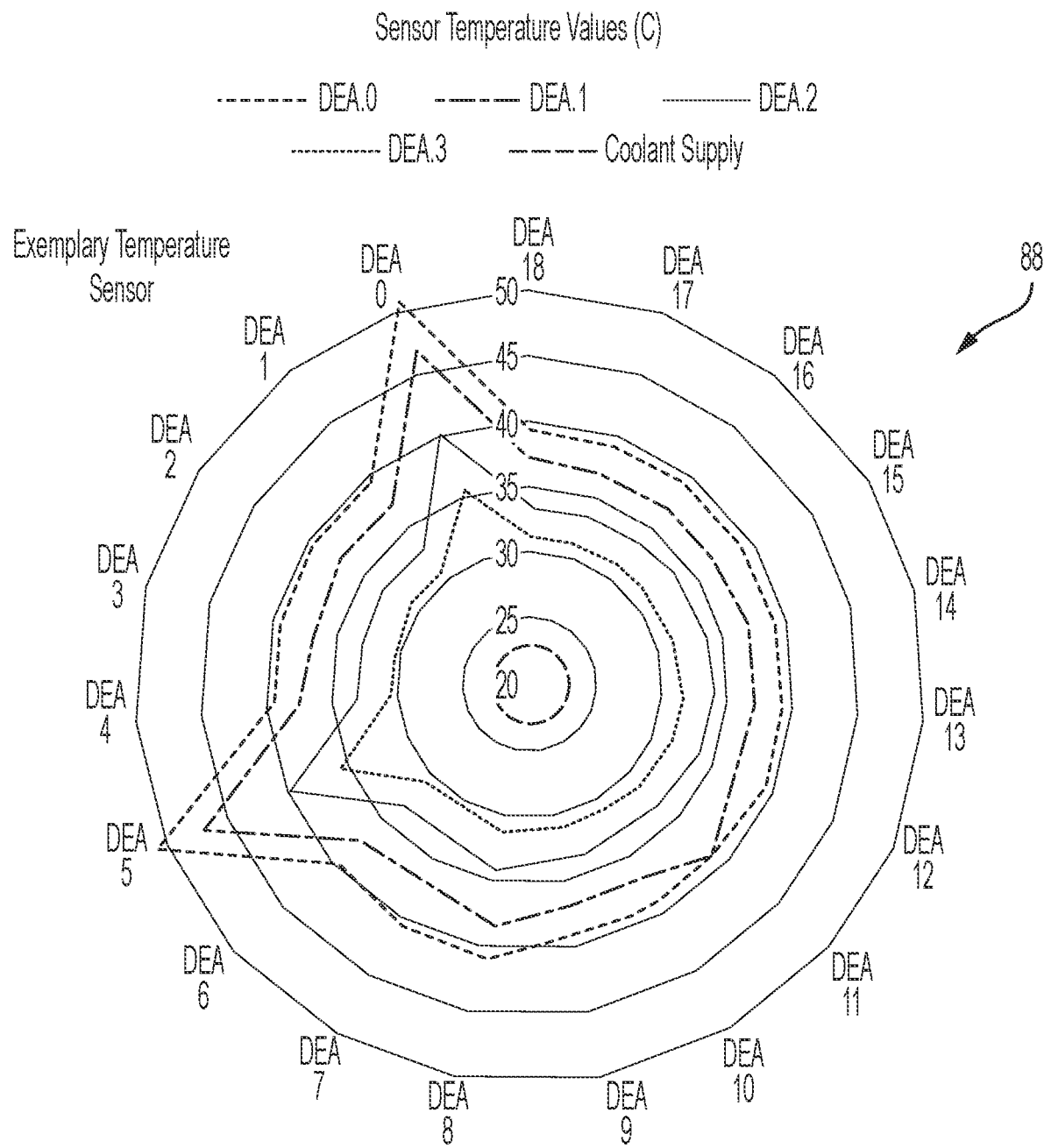
FIG. 7A depicts a radar plot of exemplary temperature sensor values for each DEA (i.e. DEA18-DEA0 in this example) in each of the detector rings (i.e. DEA.0, DEA.1, DEA.2, and DEA.3 along with a coolant supply temperature as reported by the selected temperature sensor.
Figure 8A:
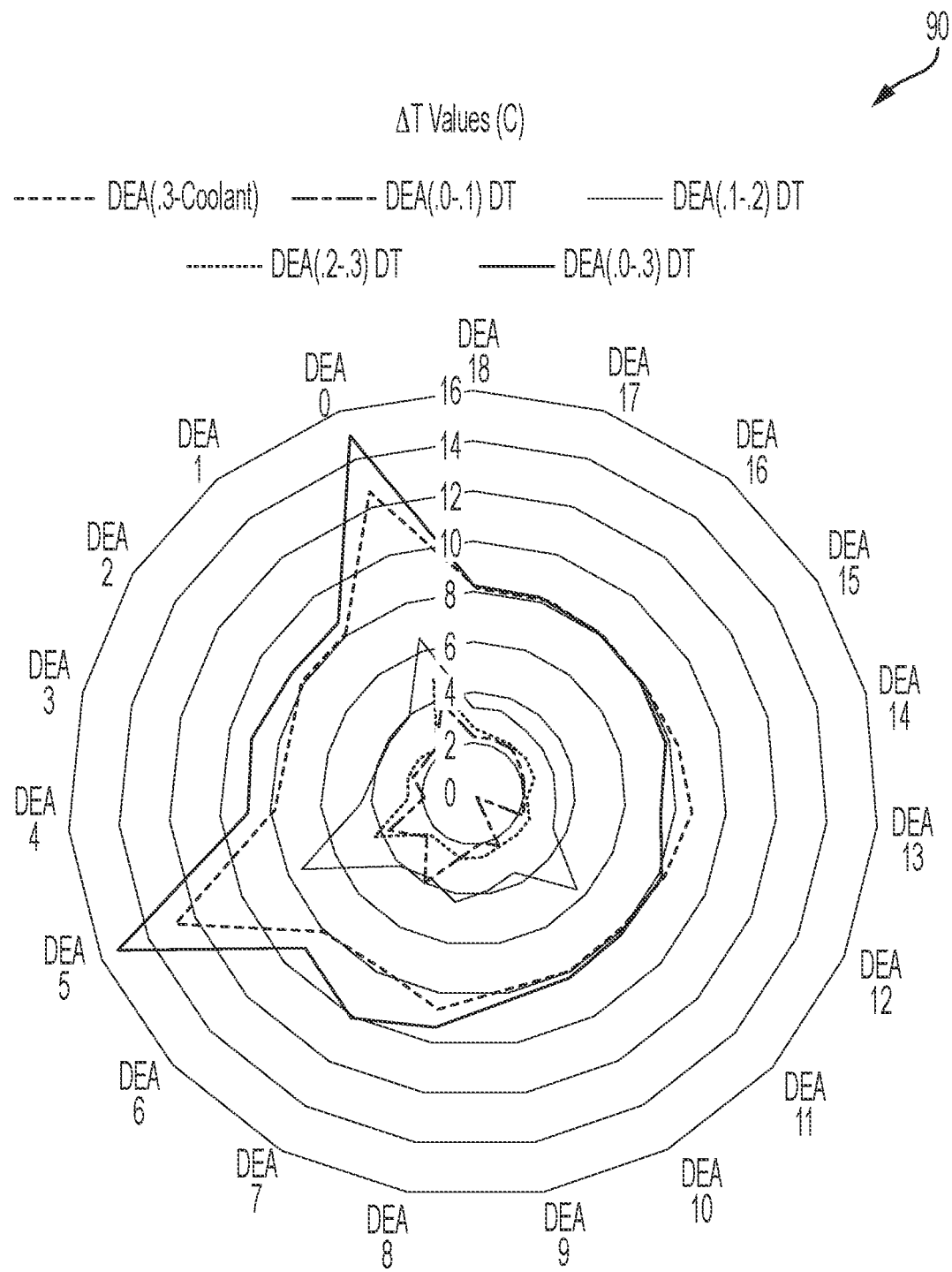
FIG. 8A depicts a radar plot of ΔT values using Eqns. (2)-(6) obtained in accordance with Step 2.
Figure 9A:
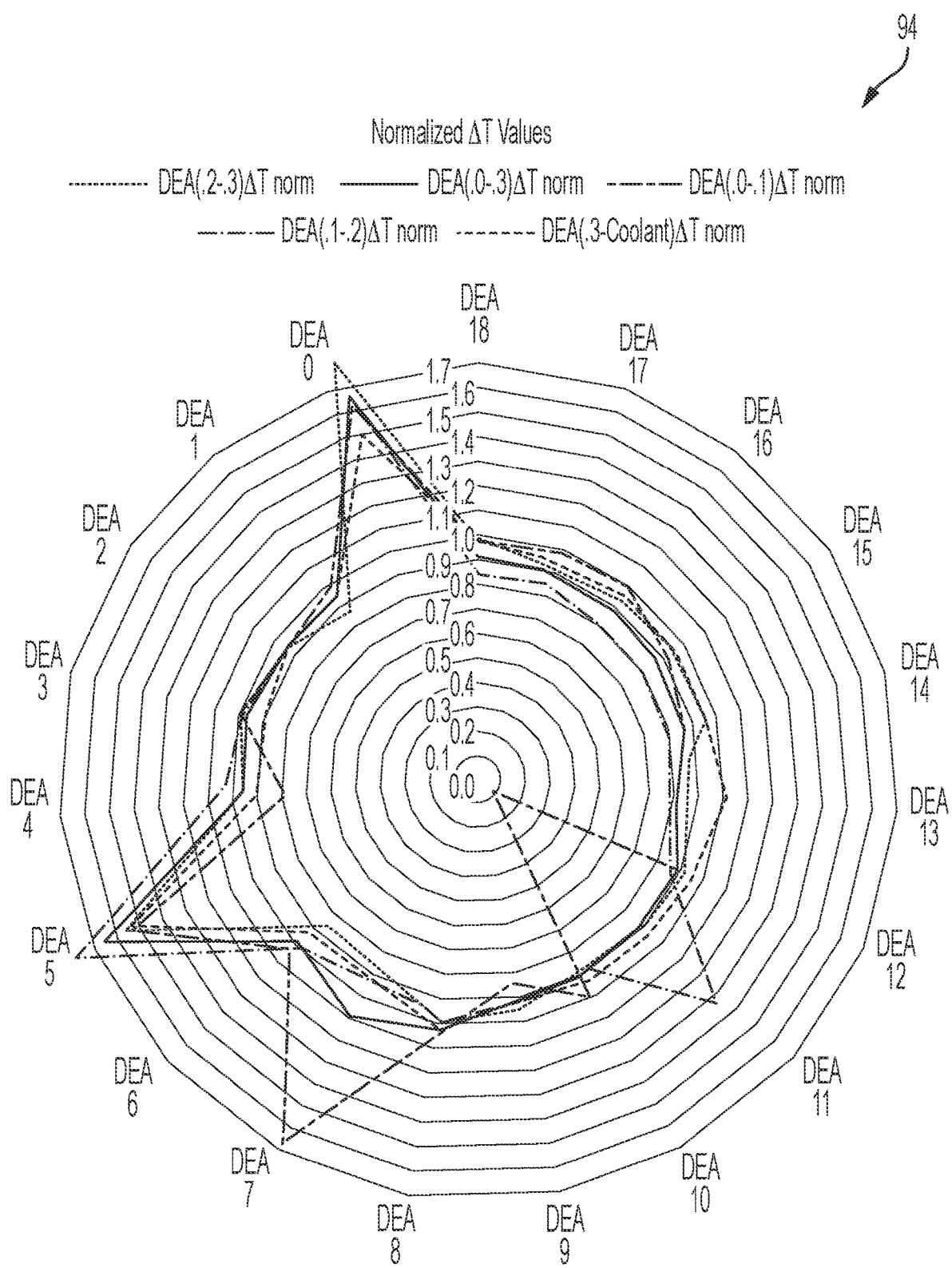
FIG. 9A shows a radar plot of normalized ΔT values using Eqns. (7)-(11) obtained in accordance with Step 4.
Figure 10:
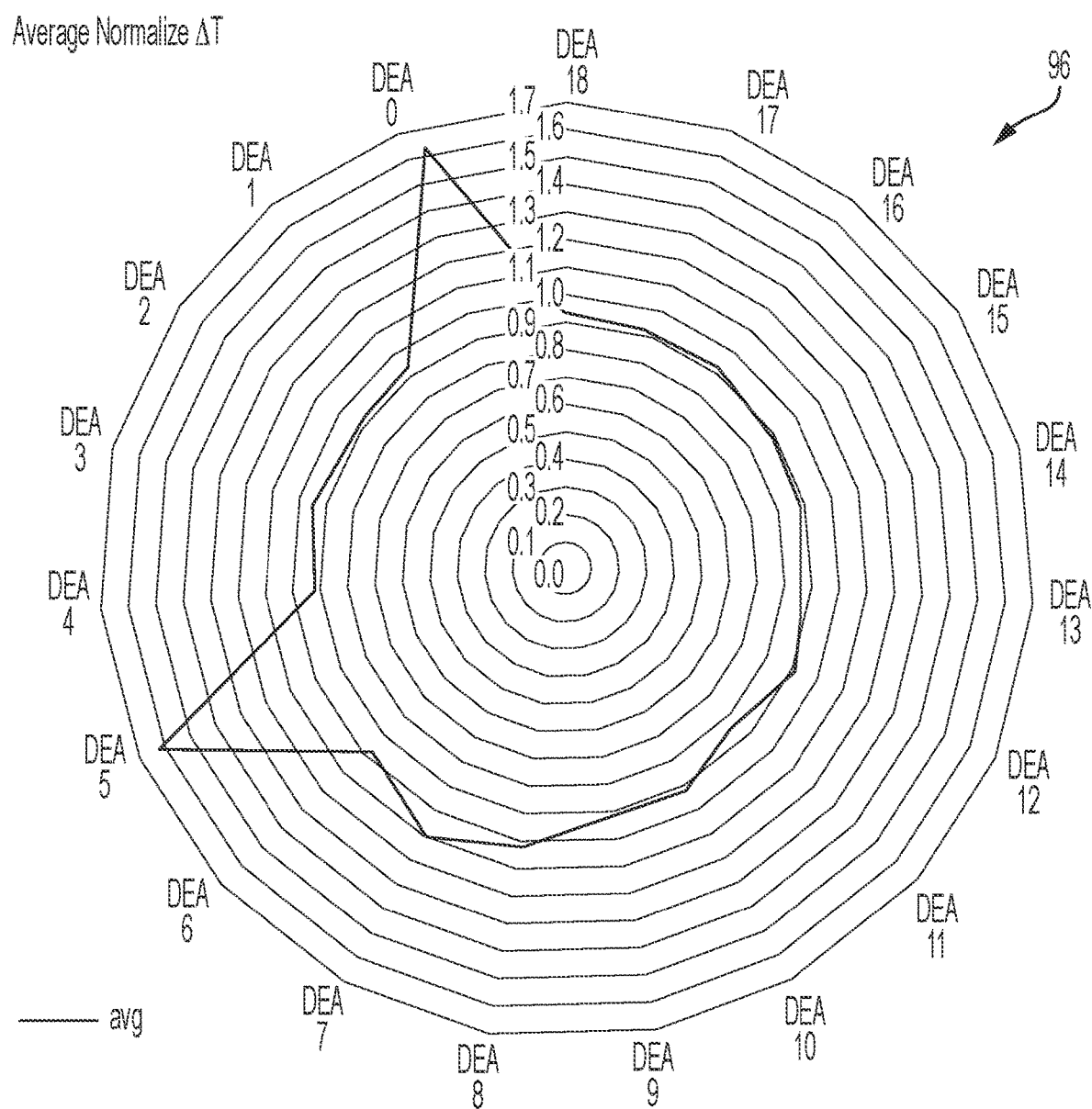
FIG. 10 shows a radar plot of average normalized ΔT values obtained in accordance with Step 5.

Regarding Step 1, FIG. 7A depicts a radar plot 88 of exemplary temperature sensor values for each DEA (i.e. DEA18-DEA0 in this example) in each of the detector rings (i.e. DEA.0, DEA.1, DEA.2, and DEA.3 along with a coolant supply temperature as reported by the selected temperature sensor and FIG. 7B lists the temperature sensor values used for radar plot 88 in Table 1. Regarding Step 2, FIG. 8A depicts a radar plot 90 of $\Delta T$ values using Eqns. (2)-(6) and FIG. 8B lists the $\Delta T$ values in Table 2. In regard to Step 3, column 92 of Table 2 (FIG. 8B) lists the average $\Delta T$ for all DEAs for each $\Delta T$ sequence determined in Step 2. FIG. 9A shows a radar plot 94 of normalized $\Delta T$ values using Eqns. (7)-(11) obtained in accordance with Step 4 and FIG. 9B lists the normalized $\Delta T$ values in Table 3. FIG. 10 shows a radar plot 96 of average normalized ΔT values obtained in accordance with Step 5 and the average normalized ΔT values are tabulated in row 98 of Table 3 (FIG. 9B). In regard to Step 6, row 100 in Table 4 shown in FIG. 11 tabulates the inverse of the average normalized ΔT values obtained from Step 5. Regarding Step 7, column 102 in Table 4 (FIG. 11) lists the average of the inversed averages for all DEAs. Regarding Step 8, the normalized inversed averages calculated in Step 6 are shown in row 104 of Table 5 of FIG. 12.

Figure 13:
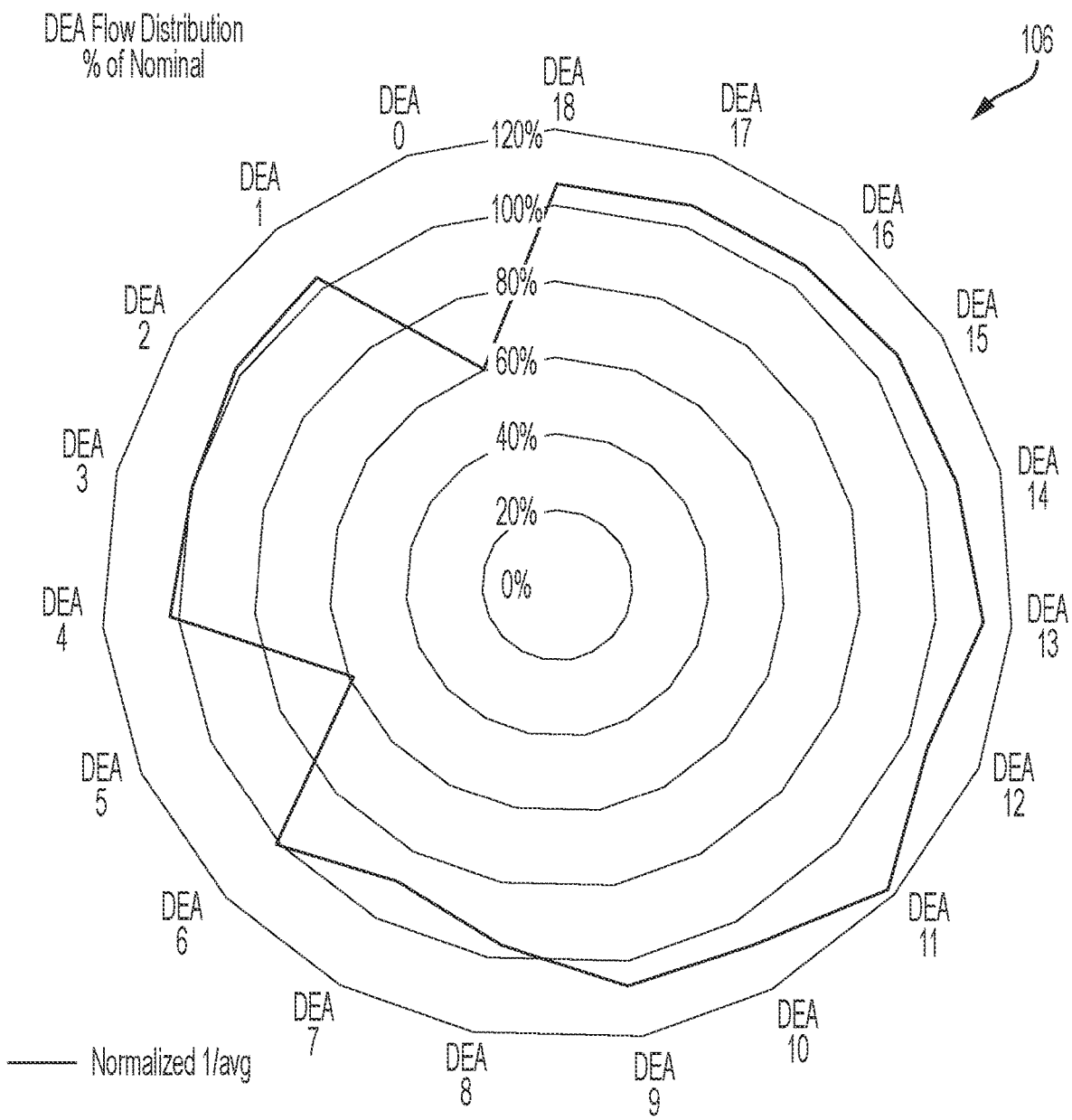
FIG. 13 depicts a radar plot of the flow through each DEA as a percentage of nominal flow.

Regarding Steps 9-11, a sample calculation, based on the exemplary data, for determining fluid flow at any given DEA will now be described. The net volumetric flow rate for the PET portion 16 is known, but the flow through each of the 19 paths is not known. In accordance with an aspect of the invention, the flow through each of the 19 paths is determined using the net system flow and the values from Steps 1-8 described above. At steady state conditions Q and $C_p$ (see Eqn. (1)) are constant. Accordingly, the energy balance equation is used to express flow rate=K/ΔT, where K is a constant that allows the DEA flow through each of the DEAs to be expressed in terms of normalized ΔT and net system flow. In accordance with an aspect of the invention, the flow at any given DEA is calculated in Eqn. (12) as follows:

$$\text{DEA flow} = \text{(normalized 1/avg)} \times \text{(net system flow)} / \text{number of DEAs in a detector ring} \quad \text{Eqn. (12)}$$

wherein "normalized 1/avg" value is obtained from row 104 of Table 5 in FIG. 12. For example, if the net system flow is approximately 4.1 gallons per minute (gpm), the flow at DEA0=0.60×4.1/19=0.13 gpm wherein "0.60" is the normalized 1/avg value for DEA0 obtained from row 104 in Table 5, "4.1" is the net system flow and "19" is the number of DEAs in a detector ring. The calculated DEA flow rate is then compared to known acceptable flow rates for the DEA to determine whether the calculated DEA flow rate is sufficient for cooling the DEA. FIG. 13 depicts a radar plot 106 of the flow through each DEA ("DEA Flow Distribution % of Nominal") when the net system flow rate is 4.1 gpm wherein the "normalized 1/avg" values obtained from row 104 of Table 5 of FIG. 12 are expressed as a percentage of nominal DEA flow.

In accordance with another aspect of the invention, it is noted that if the flow rate is relatively low when the calculations set forth herein are made, the values in row 104 of Table 5 of FIG. 12 will also apply to higher flow rates due to fluid system affinity characteristic. It is further noted that if the net system flow through 19 parallel paths and prior to distribution is not known, the specific heat of the coolant may be used as an alternative.

As previously described, electronic components associated with each detector are liquid cooled in order to remove undesirable heat that affects reliability and operation of the electronic components. The coolant is supplied to the electronic components via coolant lines at a suitable flow rate for removing sufficient heat. The detectors include numerous electronic components that are kept within temperature limits during normal operation. Several different faults may cause the electrical components to exceed their normal operating temperature limits. One type of fault occurs when a block of detectors exceeds a temperature threshold due to coolant lines that are incorrectly connected or cross connected.

Figure 14:
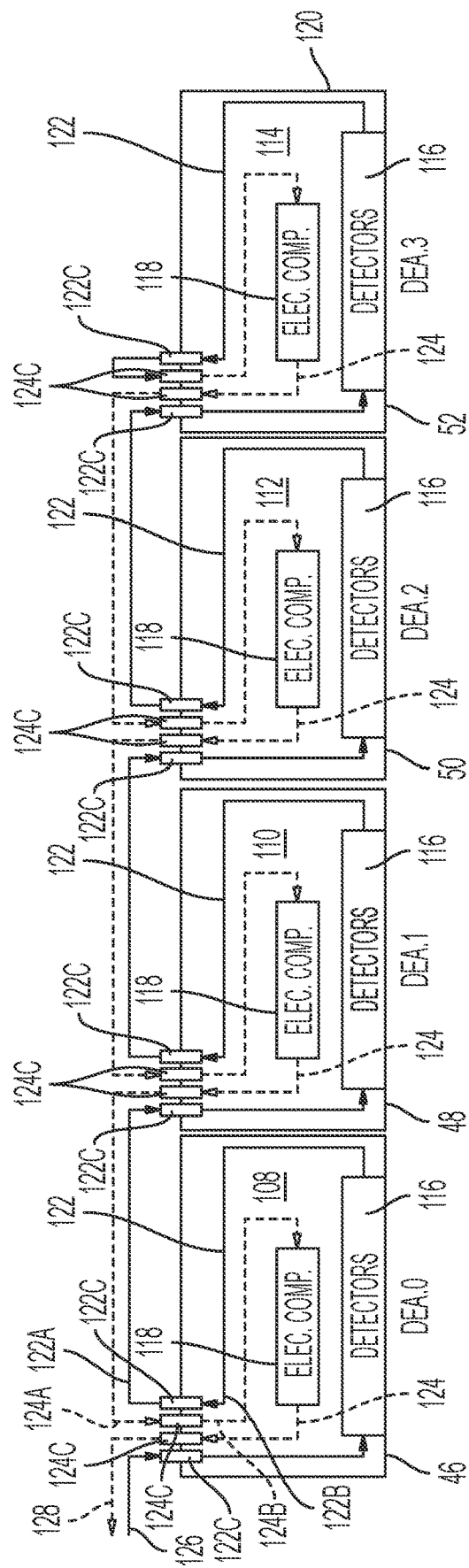
FIG. 14 is a schematic representation of coolant hoses used to connect aligned first, second, third and fourth DEAs located in first, second, third and fourth detector rings, respectively.

Referring to FIG. 14, a schematic representation of coolant hoses or lines used to connect aligned first 108, second 110, third 112 and fourth 114 DEAs (i.e. designated as DEA.0, DEA.1, DEA.2 and DEA.3, respectively) located in the first 46, second 48, third 50 and fourth 52 detector rings, respectively, is shown. Each DEA (i.e. DEA.0, DEA.1, DEA.2, and DEA.3) includes a detector block 116 and a DEA electronics section 118. For example, each detector block 116 may include 16 PET detector elements arranged in 2 rows of 8 detector elements each and the DEA electronics 118 includes electronic components. The detector block 116 and DEA electronics are cooled by coolant supplied by coolant hoses that form a single cooling line 120 having first pass 122 and second pass 124 lines. In an embodiment, PET portion 16 includes 4 detector rings 46, 48, 50, 52 each having 19 DEAs or a total of 76 DEAs. Each DEA has an inlet and outlet connection for the first pass 122 and second pass 124 lines resulting in 4 connections per DEA or 304 connections for the entire system. Further, 171 hoses must be connected correctly to 304 DEA connections. Thus, the likelihood of cross connected coolant lines is high.

The first pass line 122 of the coolant line 120 is connected between the detector blocks 116 associated with DEA.0 and DEA.1, DEA.1 and DEA.2, and DEA.2 and DEA.3. The second pass line 124 of the coolant line 120 is connected between the DEA electronics associated with DEA.3 and DEA.2, DEA.2 and DEA.1, and DEA.1 and DEA.0 such that the detector blocks 116 and DEA electronics 118 are connected in series to form a series cooling line arrangement. The coolant is received at an inlet 126 of the first pass line 122 located at DEA.0. The coolant exits the second pass line 124 at an outlet 128 located at DEA.0. Each DEA (i.e. DEA.0, DEA.1, DEA.2, and DEA.3) includes coolant line connector sections that serve to connect a first pass line segment 122A to another first pass line segment 122B of the first pass line 122 and a second pass line segment 124A to another second pass line segment 124B of the second pass line 124. For example, first pass line segment 122A is connected to first pass line segment 122B by a first pass line connector 122C of DEA.0. In addition, second pass line segment 124A is connected to second pass line segment 124B by a second pass line connector 124C of DEA.0.

During operation of the PET portion 16 of system 12, electronic components in each DEA (i.e. DEA.0, DEA.1, DEA.2, and DEA.3) generate heat which is transferred to the coolant and carried away by the coolant at a suitable flow rate, thus cooling the detector blocks 116 and DEA electronics 118 and increasing the temperature of the coolant. The first pass line 122 initially supplies first pass coolant to the detector blocks 116 in order to cool the detector blocks 116. The second pass line 124 receives coolant from the first pass line 122 which is then supplied to the DEA electronics 118 in order to cool the DEA electronics 118. The temperature of the coolant increases as the coolant flows through the first pass 122 and second pass 124 lines. In particular, detector block temperatures do not typically exhibit a pronounced temperature increase from one DEA to the next DEA in the first pass line 122 because, by design, the heat load of the detector blocks 116 is relatively low and the coolant flow rate is high. Detector block temperatures are substantially influenced by their degree of thermal contact with an associated chill plate.

The order of connections of the first pass 122A, 122B and second pass 124A, 124B line segments to the first pass 122C and second pass 124C line connectors to connect DEA.0, DEA.1, DEA.2, and DEA.3 in series flow is important. If first pass 122A, 122B and second pass 124A, 124B line segments are incorrectly connected by, for example, connecting a second pass line segment 124A to a first pass line connector 122C (i.e. cross connected), detectors in the associated DEA will not receive first pass coolant. Instead the detectors will receive coolant at a relatively high temperature because the coolant will have already removed a high heat load from other electronics in the second pass line 124. This causes the blocks of the associated DEA to operate at a higher than expected temperature, making the system 12 susceptible to shut down due to an error threshold temperature (for example, 40 C) being exceeded.

It is important that the continuity of coolant lines is verified to ensure that coolant lines are not cross connected. In accordance with an aspect of the invention, a combination of conditional criteria and board mounted components that report temperatures with sufficient consistency is identified such that any variation in thermal contact does not overshadow sensitivity to coolant flow. It is important that the sensors selected report temperatures from locations where changes in coolant flow rate yield substantially repeatable changes in temperature to enable detection when the order of flow is incorrect due to cross connected lines, for example.

A method for verifying continuity of coolant lines in a PET system based on a set of conditions will now be described. A first condition includes determining whether the flow rate of the PET gantry is reduced to a sufficiently low flow rate for a sufficient amount of time to increase sensitivity of circuit board mounted temperature sensors that meet the previously described sensor criteria. For example, if a nominal flow rate for the PET gantry is 10 gpm, the flow rate is reduced to approximately 4.8 gpm for a time duration of approximately 10 minutes or longer. In accordance with an aspect of the invention, lowering the flow rate increases $\Delta T$ by a sufficient amount to ensure that the temperatures reported by temperature sensors are not due to poor thermal contact of a temperature sensor with an associated chill plate.

A second condition includes determining whether a temperature of electronic components of each DEA in the second pass line 124 progressively increases from a first DEA (i.e. fourth DEA 114) in the second pass line 124 to a last DEA (i.e. first DEA 108) in the second pass line 124 (i.e. whether electronic component temperatures of DEA.3≤DEA.2≤DEA.1≤DEA.0, for example) by using a first temperature sensor that meets the sensor criteria.

A third condition includes determining whether the temperature of electronic components in the second pass line 124 progressively increases from the first DEA (i.e. fourth DEA 114) in the second pass line 124 to the last DEA (i.e. first DEA 108) in the second pass line 124 (i.e. whether component temperatures of DEA.3≤DEA.2≤DEA.1≤DEA.0, for example) by using a second temperature sensor that meets the sensor criteria.

A fourth condition includes determining whether the temperature of electronic components in the second pass line 124 progressively increases from the first DEA (i.e. fourth DEA 114) in the second pass line 124 to the last DEA (i.e. first DEA 108) in the second pass line 124 (i.e. whether component temperatures of DEA.3≤DEA.2≤DEA.1≤DEA.0, for example) by using a third temperature sensor that meets the sensor criteria.

A fifth condition includes determining whether an average detector block temperature of a single DEA (i.e. either DEA.3 or DEA.2 or DEA.1 or DEA.0, for example) does not deviate from the average detector block temperature of the remaining DEAs in the same detector ring as the single DEA by more than a predetermined amount. In an embodiment, the predetermined amount is approximately 1 C. For example, in a detector ring having 19 DEAs, a determination is made as to whether the average detector block temperature of a single DEA does not deviate from the average detector block temperature of the remaining 18 DEAs in the same detector ring by more than 1 C. In accordance with an aspect of the invention, if the first condition is true and the second, third, fourth and fifth conditions are all false then an incorrect coolant line connection is indicated.

Figure 15A:
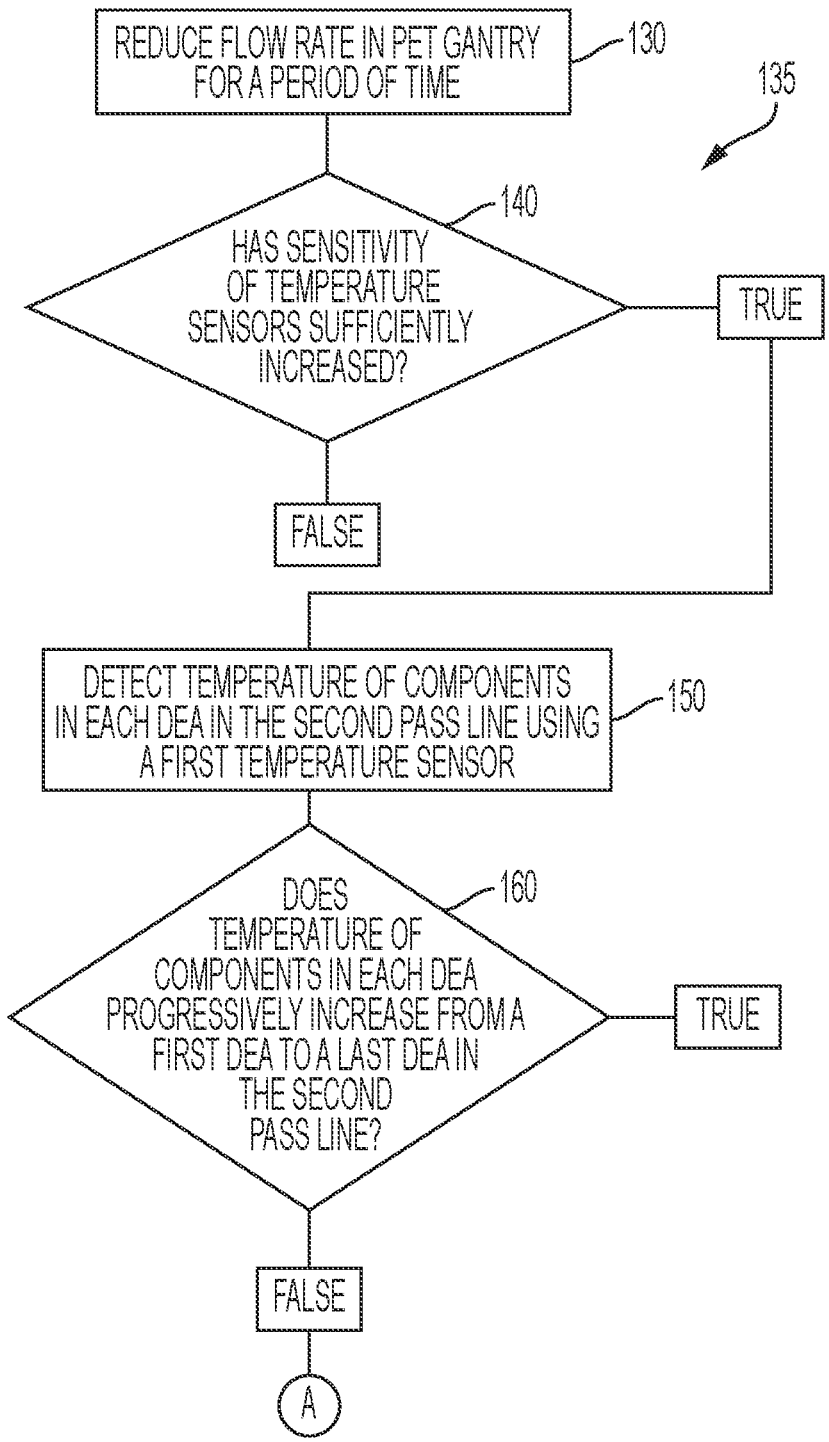
FIGS. 15A-15C depict a flowchart for a method of verifying continuity of coolant lines in a PET system.
Figure 15B:
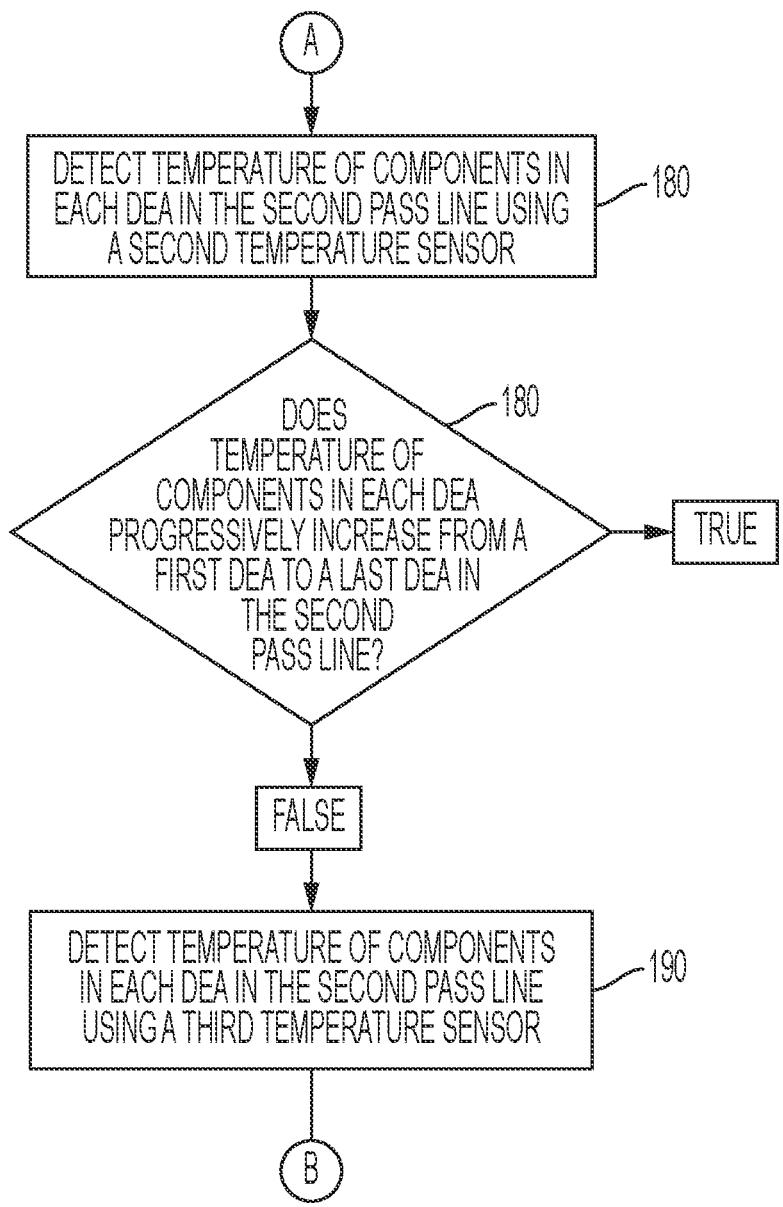
Figure 15C:
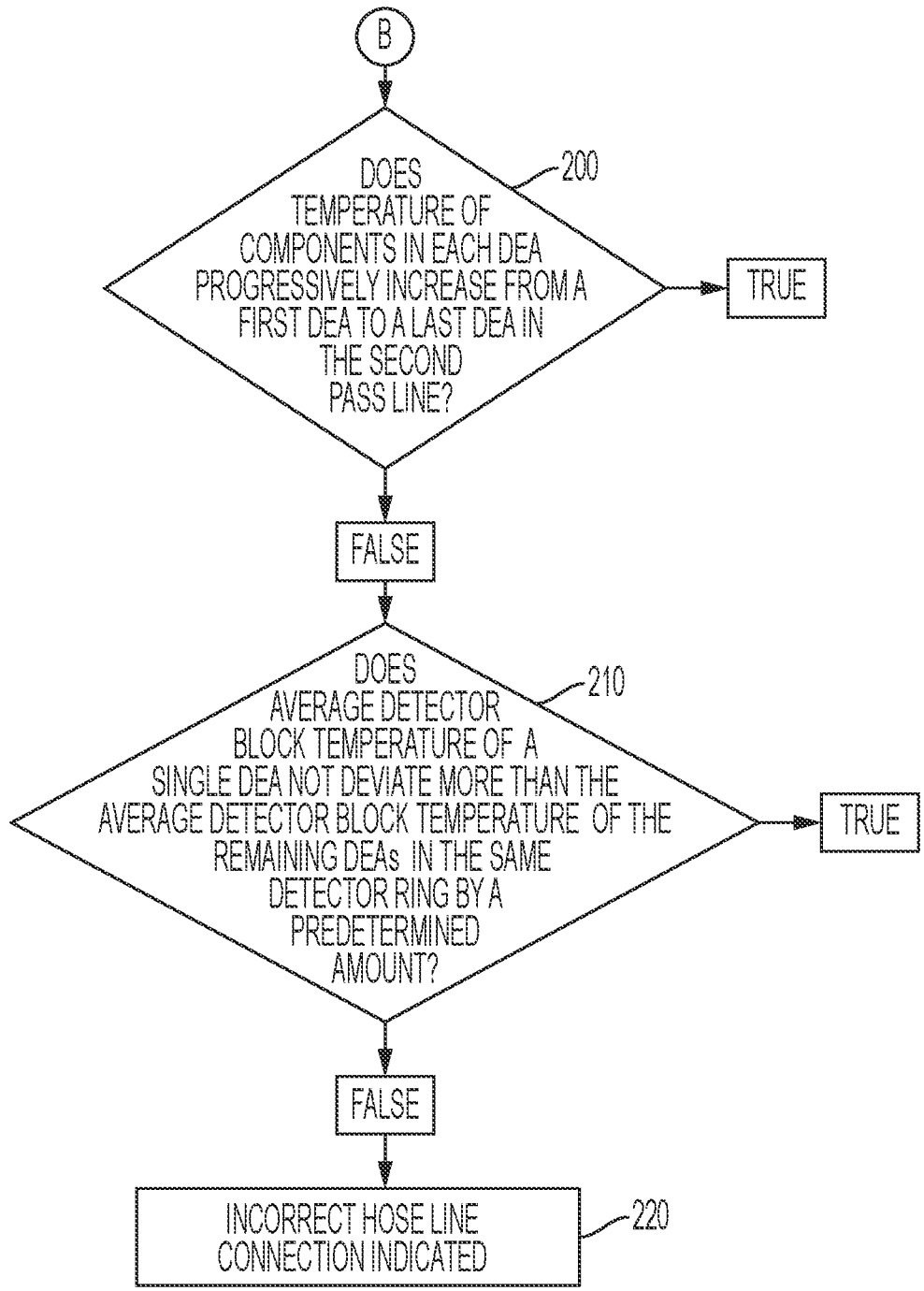

FIGS. 15A-15C depict a flowchart for a method 135 of verifying continuity of coolant lines in a PET system. In accordance with an aspect of the invention, the method 135 (FIG. 15A-15C) of verifying continuity of coolant lines may be performed before the method 85 (FIGS. 6A-6C) of calculating a flow rate through each coolant flow path previously described.

At Step 130, a flow rate in the PET gantry is reduced for a period of time. At Step 140, a determination is made as to whether the sensitivity of temperature sensors that meet the sensor criteria has sufficiently increased. If the sensitivity has sufficiently increased (i.e. TRUE), a temperature of electronic components located in each DEA in the second pass line 124 is detected by a first temperature sensor at Step 150. At Step 160, a determination is made as to whether the temperature of the electronic components progressively increases from a first DEA to a last DEA in the second pass line 124 when using the first temperature sensor. If the temperature reported by the first temperature sensor does not progressively increase (i.e. FALSE), a temperature of electronic components located in each DEA in the second pass line 124 is detected by a second temperature sensor at Step 170. At Step 180, a determination is made as to whether the temperature of the electronic components progressively increases from the first DEA to the last DEA in the second pass line 124 when using the second temperature sensor. If the temperature reported by the second temperature sensor does not progressively increase (i.e. FALSE), a temperature of electronic components located in each DEA in the second pass line 124 is detected by a third temperature sensor at Step 190. At Step 200, a determination is made as to whether the temperature of the electronic components progressively increases from the first DEA to the last DEA in the second pass line 124 when using the third temperature sensor. If the temperature reported by the third temperature sensor does not progressively increase (i.e. FALSE), a determination is made as to whether an average detector block temperature of a single DEA does not deviate from the average detector block temperature of the remaining DEAs in the same detector ring by more than a predetermined amount at Step 210. If the average block temperature deviates by more than the predetermined amount (i.e. FALSE), an incorrect hose line connection or cross connected hose lines is indicated at Step 220 if the determination of Step 140 is TRUE and that of Steps 160, 180, 200 and 210 is FALSE. If the determinations of Step 140 is FALSE and that of Steps 160, 180, 200 and 210 is TRUE, the method 135 stops.

Figure 16:
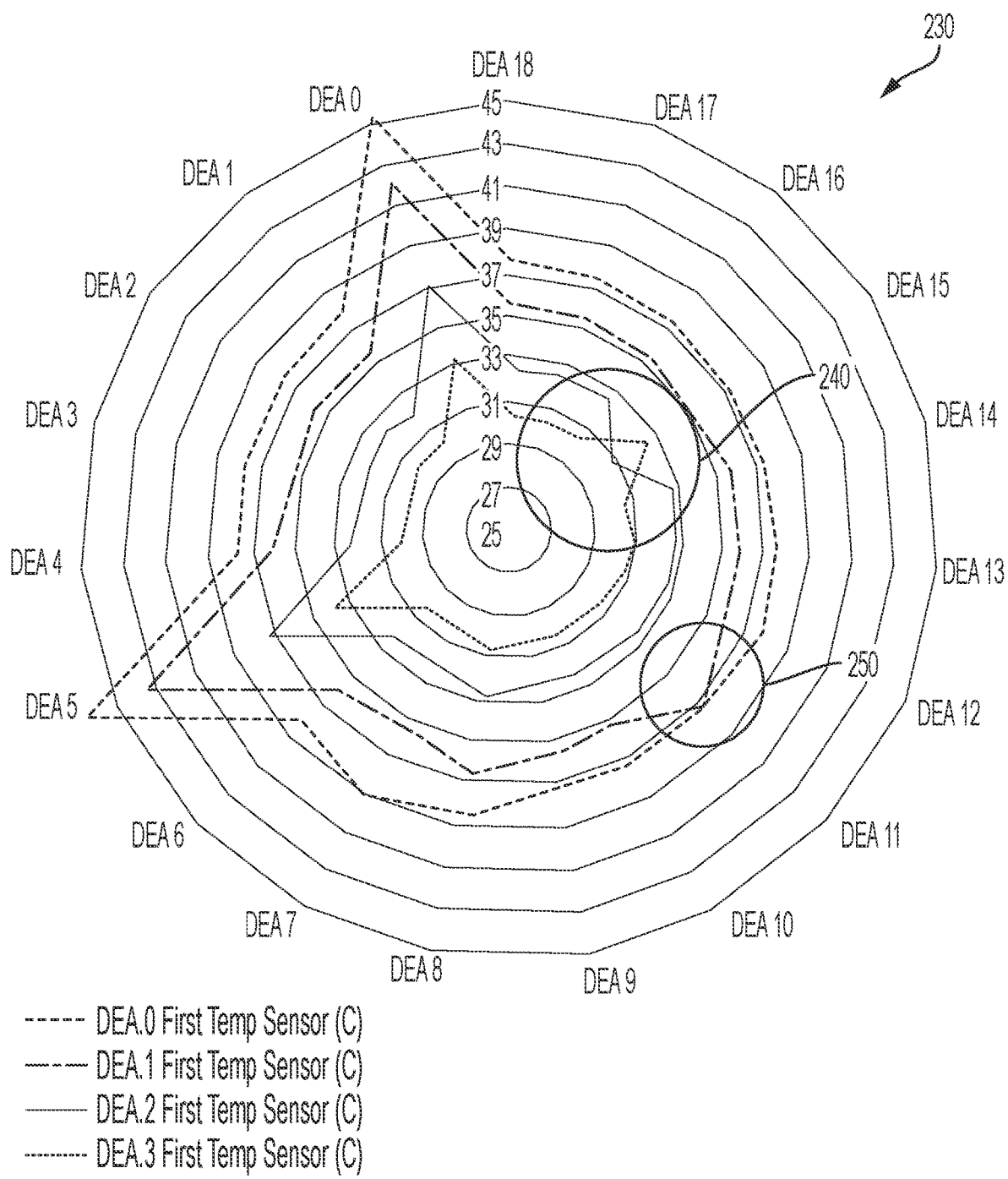
FIG. 16 is a radar plot of exemplary temperatures for DEA.0, DEA.1, DEA.2 and DEA.3 reported by a first temperature sensor.

For purposes of illustration, the method 135 for verifying continuity of coolant lines in a PET system will be described in conjunction with exemplary temperature values detected by exemplary temperature sensors. Referring to FIG. 16, a radar plot 230 is shown of exemplary temperatures for DEA.0, DEA.1, DEA.2 and DEA.3 reported by a first temperature sensor in accordance with Step 150. In FIG. 16, the temperatures for DEA.3 and DEA.2 overlap as shown in circled region 240 corresponding to DEA 15. In addition, the temperatures for DEA.1 and DEA.0 overlap in the circled region 250 corresponding to DEA 11. Thus, the determination at Step 160 is FALSE at DEA 11 and DEA 15.

Figure 17:
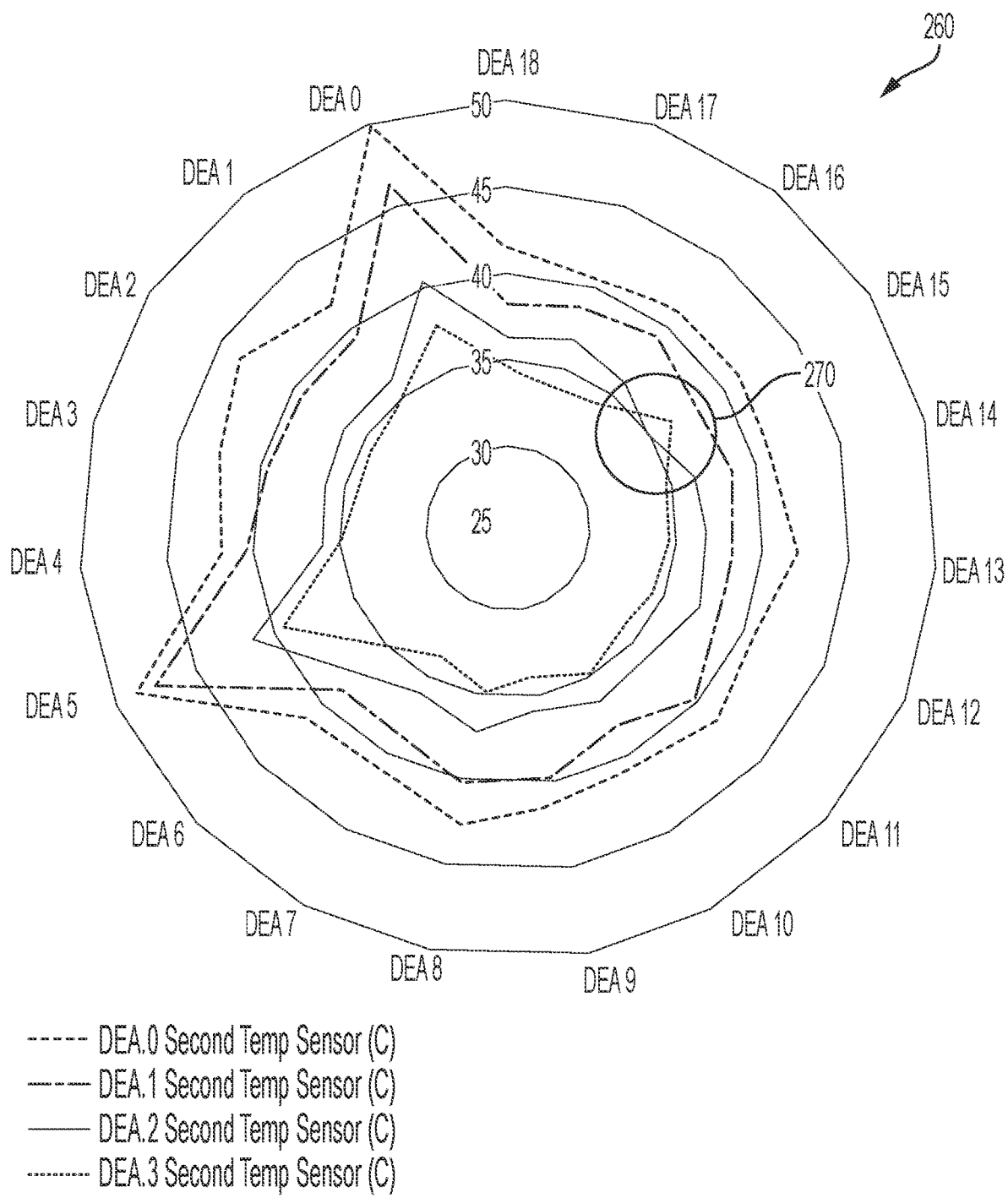
FIG. 17 is a radar plot of exemplary temperatures for DEA.0, DEA.1, DEA.2 and DEA.3 reported by a second temperature sensor.

Referring to FIG. 17, a radar plot 260 is shown of exemplary temperatures for DEA.0, DEA.1, DEA.2 and DEA.3 reported by a second temperature sensor in accordance with Step 170. In FIG. 17, the temperatures for DEA.3 and DEA.2 overlap as shown in circled region 270 corresponding to DEA 15. Thus, the determination at Step 180 is FALSE at DEA 15.

Figure 18:
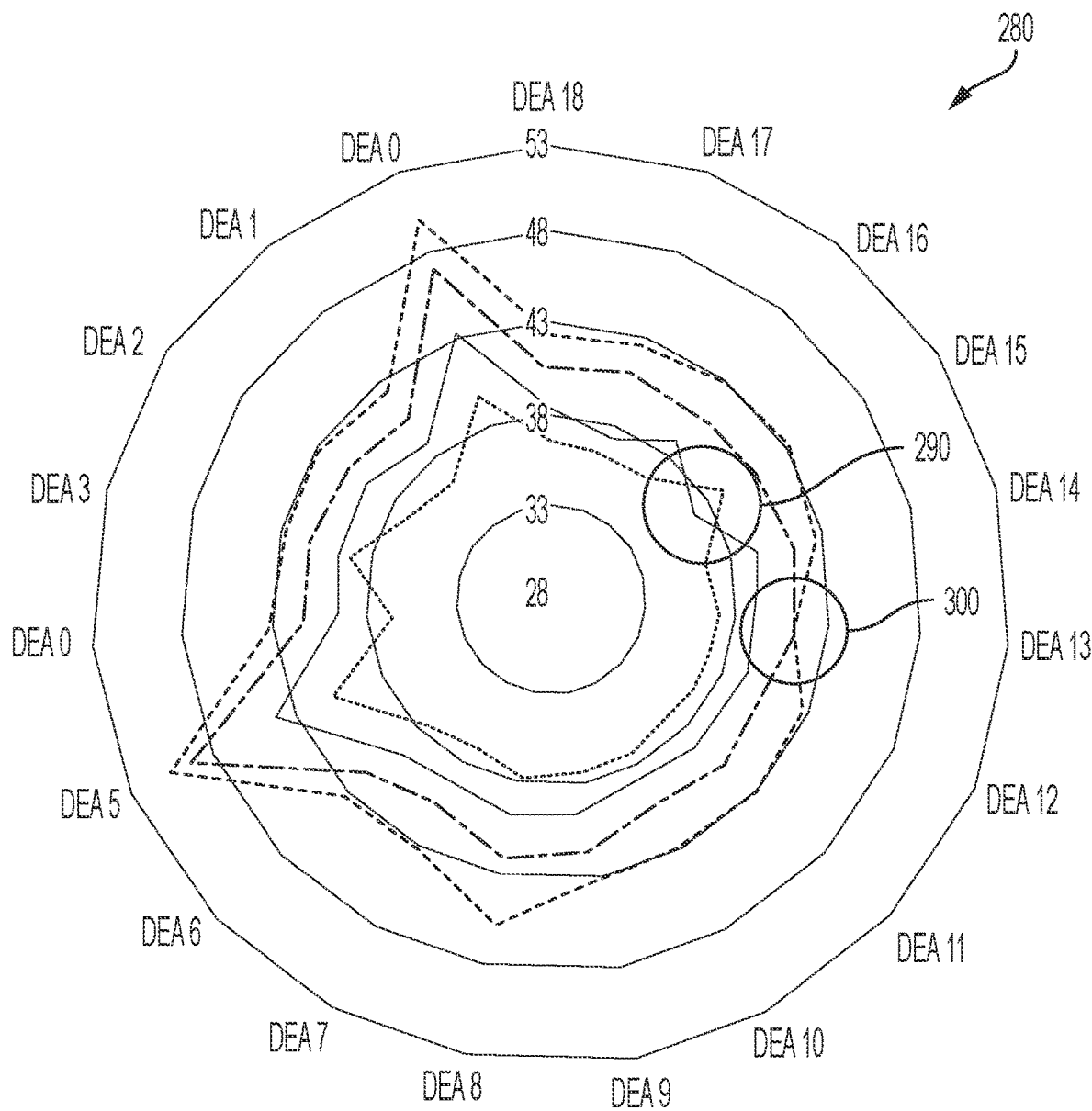
FIG. 18 is a radar plot of exemplary temperatures for DEA.0, DEA.1, DEA.2 and DEA.3 reported by a third temperature sensor.

Referring to FIG. 18, a radar plot 280 is shown of exemplary temperatures for DEA.0, DEA.1, DEA.2 and DEA.3 reported by a third temperature sensor in accordance with Step 190. In FIG. 18, the temperatures for DEA.3 and DEA.2 overlap as shown in circled region 290 corresponding to DEA 15. In addition, the temperatures for DEA.1 and DEA.0 overlap as shown in circled region 300 corresponding to DEA 13. Thus, the determination at Step 200 is FALSE at DEA 13 and DEA 15.

Figure 19:
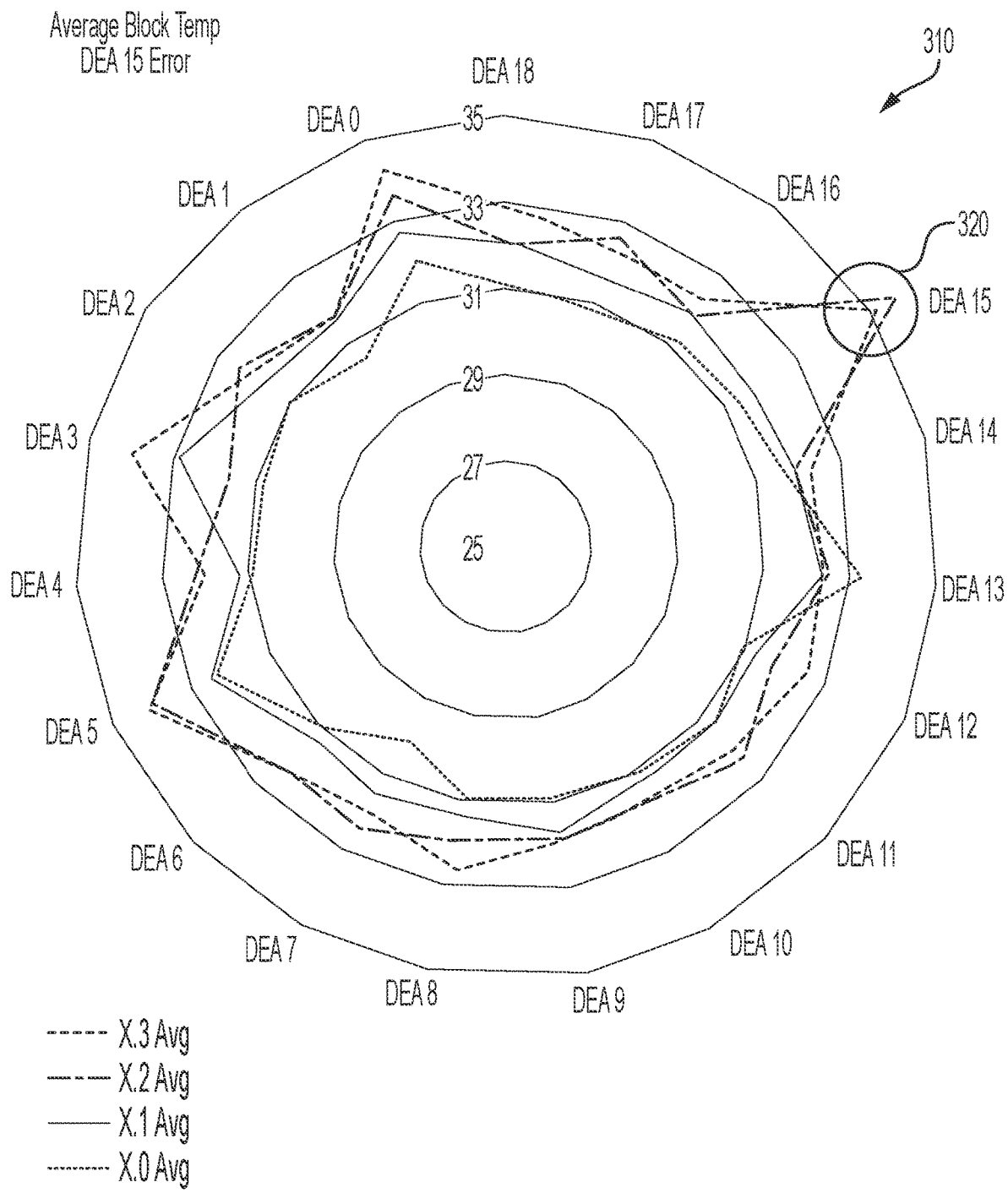
FIG. 19 is a radar plot of exemplary average detector block temperatures.

Referring to FIG. 19, a radar plot 310 is shown of exemplary average detector block temperatures in accordance with Step 210. In FIG. 19, the circled region 320 corresponding to DEA 15 provides a FALSE determination in accordance with Step 210 when the predetermined amount is selected as 1C. Thus, DEA 15 fails the continuity of coolant lines test because the previously described second, third, fourth and fifth conditions, corresponding to Steps 160, 180, 200 and 210, respectively, were all FALSE.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

I claim:

1. A method of calculating a flow rate through a coolant flow path of a detector electronic assembly (DEA) of a positron emission tomography (PET) imaging system having a plurality of PET detector rings each including a plurality of PET detectors having an associated DEA, comprising:
   (a) detecting a temperature value for each DEA in each PET detector ring;
   (b) calculating a change in temperature ($\Delta T$) between the PET detector rings for each aligned DEA based on the temperature values to provide more than one sequence of $\Delta T$ values;
   (c) calculating an average $\Delta T$ of all DEAs for each $\Delta T$ sequence determined in step (b);
   (d) normalizing each $\Delta T$ value calculated in step (b) by dividing each $\Delta T$ value by the average $\Delta T$ for that series as calculated in step (c);
   (e) calculating an average of the normalized $\Delta T$ values obtained in step (d) for each DEA;
   (f) calculating the inverses of the average normalized $\Delta T$ values obtained in step (e);
   (g) calculating the average of the inversed averages for all DEAs;
   (h) normalizing the inversed averages calculated in step (f) by dividing the inversed averages by the average of all DEAs calculated in step (g);
   (i) determining net DEA flow by summing the coolant flow rates reported by system flow meters;
   (j) determining nominal flow at each DEA by dividing the net DEA flow by the number of DEAs; and
   (k) multiplying nominal DEA flow at each DEA by the corresponding values calculated in step (h) for normalized inversed averages to determine flow at each DEA.

2. The method according to claim 1, wherein the temperature values are detected by temperature sensors that meet defined sensor criteria.

3. The method according to claim 2, wherein the temperature values are a surrogate for coolant $\Delta T$.

4. The method according to claim 2, wherein the sensor criteria includes that the temperature sensors are replicated on different locations on the coolant flow path.

5. The method according to claim 1, wherein the coolant flow path is defined by a single coolant line having a first pass section and a return section.

6. The method according to claim 5, wherein the first pass and return sections include first and second sets of electronics, respectively, to form a series cooling line arrangement.

7. The method according to claim 1, wherein the flow at each DEA (step (k)) is calculated by:

$$\text{DEA flow} = (\text{normalized } 1/\text{avg}) \times (\text{net system flow}) / \text{number of DEAs in a detector ring}$$

wherein DEA flow is the flow rate at each DEA,
normalized 1/avg is obtained in step (h),
net system flow is obtained in step (i),
number of DEAs in a detector ring=number of PET detectors in the respective detector ring.

8. A method of verifying continuity of coolant lines in a coolant flow path of a detector electronic assembly (DEA) of a positron emission tomography (PET) imaging system having a plurality of PET detector rings each including a plurality of PET detectors having an associated DEA, comprising:
   (a) reducing a screening flow rate in a PET gantry of the PET imaging system for a period of time;
   (b) detecting a temperature of electronic components in each DEA in a second pass line of the coolant flow path using a first temperature sensor;
   (c) determining whether the temperature detected in step (b) progressively increases from a first DEA to a last DEA in the second pass line;
   (d) detecting a temperature of electronic components in each DEA in the second pass line using a second temperature sensor;
   (e) determining whether the temperature detected in step (d) progressively increases from the first DEA to the last DEA in the second pass line;
   (f) detecting a temperature of electronic components in each DEA in the second pass line using a third temperature sensor;
   (g) determining whether the temperature detected in step (f) progressively increases from the first DEA to the last DEA in the second pass line; and
   (h) determining whether an average detector block temperature of a single DEA does not deviate from the average detector block temperature of the remaining DEAs in the same detector ring by more than a predetermined amount wherein if the average block temperature deviates by more than the predetermined amount and the detected temperature in steps (c), (e) and (g) does not progressively increase, an incorrect hose line connection is indicated.

9. The method according to claim 8, wherein the predetermined amount is 1 C.

10. The method according to claim 8, wherein the temperature values are detected by temperature sensors that meet defined sensor criteria.

11. The method according to claim 10, wherein the sensor criteria includes that the temperature sensors are replicated on different locations on the coolant flow path.

12. The method according to claim 8, wherein the screening flow rate in step (a) is reduced to a flow rate lower than a nominal flow rate for a PET gantry.

13. The method according to claim 12, wherein the nominal flow rate is approximately 10 gallons per minute (gpm) and the screening flow rate in step (a) is approximately 4.8 gpm.

14. The method according to claim 8, wherein the period of time is approximately 10 minutes.

15. The method according to claim 8, wherein the PET imaging system includes aligned first, second, third and fourth DEAs in the second pass line designated as DEA.0, DEA.1, DEA.2 and DEA.3, respectively and the temperatures of the electronic components in steps (c), (e) and (g) progressively increase in accordance with DEA.3≤DEA.2≤DEA.1≤DEA.0 in the second pass line.

16. A method for detecting potential faults in a cooling system that cools a detector electronic assembly (DEA) of a positron emission tomography (PET) imaging system having a plurality of PET detector rings each including a plurality of PET detectors having an associated DEA, comprising:
- (1) verifying continuity of coolant lines in a first coolant flow path of a DEA by:
  - (a) reducing a screening flow rate in a PET gantry of the PET imaging system for a period of time;
  - (b) detecting a temperature of electronic components in each DEA in a second pass line of the first coolant flow path using a first temperature sensor;
  - (c) determining whether the temperature detected in step (b) progressively increases from a first DEA to a last DEA in the second pass line;
  - (d) detecting a temperature of electronic components in each DEA in the second pass line using a second temperature sensor;
  - (e) determining whether the temperature detected in step (d) progressively increases from the first DEA to the last DEA in the second pass line;
  - (f) detecting a temperature of electronic components in each DEA in the second pass line using a third temperature sensor;
  - (g) determining whether the temperature detected in step (f) progressively increases from the first DEA to the last DEA in the second pass line;
  - (h) determining whether an average detector block temperature of a single DEA does not deviate from the average detector block temperature of the remaining DEAs in the same detector ring by more than a predetermined amount wherein if the average block temperature deviates by more than the predetermined amount and the detected temperature in steps (c), (e) and (g) does not progressively increase, an incorrect hose line connection is indicated; and
- (2) calculating a flow rate through a second coolant flow path of a DEA by:
  - (i) detecting a temperature value for each DEA in each PET detector ring;
  - (j) calculating a change in temperature (ΔT) between the PET detector rings for each aligned DEA based on the temperature values to provide more than one sequence of ΔT values;
  - (k) calculating an average ΔT of all DEAs for each ΔT sequence determined in step (j);
  - (l) normalizing each ΔT value calculated in step (j) by dividing each ΔT value by the average ΔT for that series as calculated in step (k);
  - (m) calculating an average of the normalized ΔT values obtained in step (l) for each DEA;
  - (n) calculating the inverses of the average normalized ΔT values obtained in step (m);
  - (o) calculating the average of the inversed averages for all DEAs;
  - (p) normalizing the inversed averages calculated in step (n) by dividing the inversed averages by the average of all DEAs calculated in step (o);
  - (q) determining net DEA flow by summing the coolant flow rates reported by system flow meters;
  - (r) determining nominal flow at each DEA by dividing the net DEA flow by the number of DEAs; and
  - (s) multiplying nominal DEA flow at each DEA by the corresponding values calculated in step (p) for normalized inversed averages to determine flow at each DEA.

17. The method according to claim 16, wherein the temperature values are a surrogate for coolant ΔT.

18. The method according to claim 16, wherein the flow at each DEA (step (s) is calculated by:

$$\text{DEA flow} = (\text{normalized } 1/\text{avg}) \times (\text{net system flow}) / \text{number of DEAs in a detector ring}$$

wherein DEA flow is the flow rate at each DEA,
normalized 1/avg is obtained in step (h),
net system flow is obtained in step (i),
number of DEAs in a detector ring=number of PET detectors in the respective detector ring.

19. The method according to claim 16, wherein the temperature values are detected by temperature sensors that are replicated on different locations on the first coolant flow path.

20. The method according to claim 16, wherein the screening flow rate in step (a) is reduced to a flow rate lower than a nominal flow rate for a PET gantry.

* * * * *